(12) United States Patent
Martin et al.

(10) Patent No.: US 11,562,701 B2
(45) Date of Patent: Jan. 24, 2023

(54) DATA PROCESSING SYSTEMS

(71) Applicant: Arm Limited, Cambridge (GB)

(72) Inventors: Samuel Martin, Waterbeach (GB); Damian Piotr Modrzyk, Katowice (PL)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/455,764

(22) Filed: Jun. 28, 2019

(65) Prior Publication Data

US 2020/0005719 A1 Jan. 2, 2020

(30) Foreign Application Priority Data

Jun. 29, 2018 (GB) ...................................... 1810704

(51) Int. Cl.
  *G09G 3/34* (2006.01)
  *G06F 3/01* (2006.01)
  *G09G 5/36* (2006.01)

(52) U.S. Cl.
  CPC ........... *G09G 3/3413* (2013.01); *G06F 3/012* (2013.01); *G09G 5/363* (2013.01); *G09G 2320/028* (2013.01); *G09G 2320/0242* (2013.01); *G09G 2354/00* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 5,684,498 A | * | 11/1997 | Welch | ...................... G09G 5/02 345/32 |
| 2003/0231191 A1 | * | 12/2003 | Glen | ...................... G09G 5/363 348/E9.024 |
| 2009/0303417 A1 | * | 12/2009 | Mizushima | .......... G02B 3/0056 349/65 |
| 2011/0221656 A1 | * | 9/2011 | Haddick | ............ G06K 9/00617 345/8 |
| 2015/0310665 A1 | | 10/2015 | Michail | |
| 2017/0213388 A1 | * | 7/2017 | Margolis | .............. H04N 19/139 |

FOREIGN PATENT DOCUMENTS

WO  2014/210342  12/2014

OTHER PUBLICATIONS

GB Combined Search and Examination Report dated Dec. 21, 2018, GB Patent Application No. GB1810704.5.
GB Examination Report dated Oct. 22, 2021, GB Patent Application No. GB1810704.5.

* cited by examiner

Primary Examiner — Sahlu Okebato
(74) Attorney, Agent, or Firm — Vierra Magen Marcus LLP

(57) ABSTRACT

In a data processing system that includes a field sequential colour display, when displaying a frame that is to be transformed based on a predicted view orientation on the field sequential colour display, each colour field to be displayed on the display for the frame is transformed based on a predicted view orientation for that particular colour field, such that each colour field will be subjected to a different view orientation transformation to the other colour fields for the frame. The so-transformed colour fields are then displayed sequentially on the display to display the frame.

17 Claims, 13 Drawing Sheets

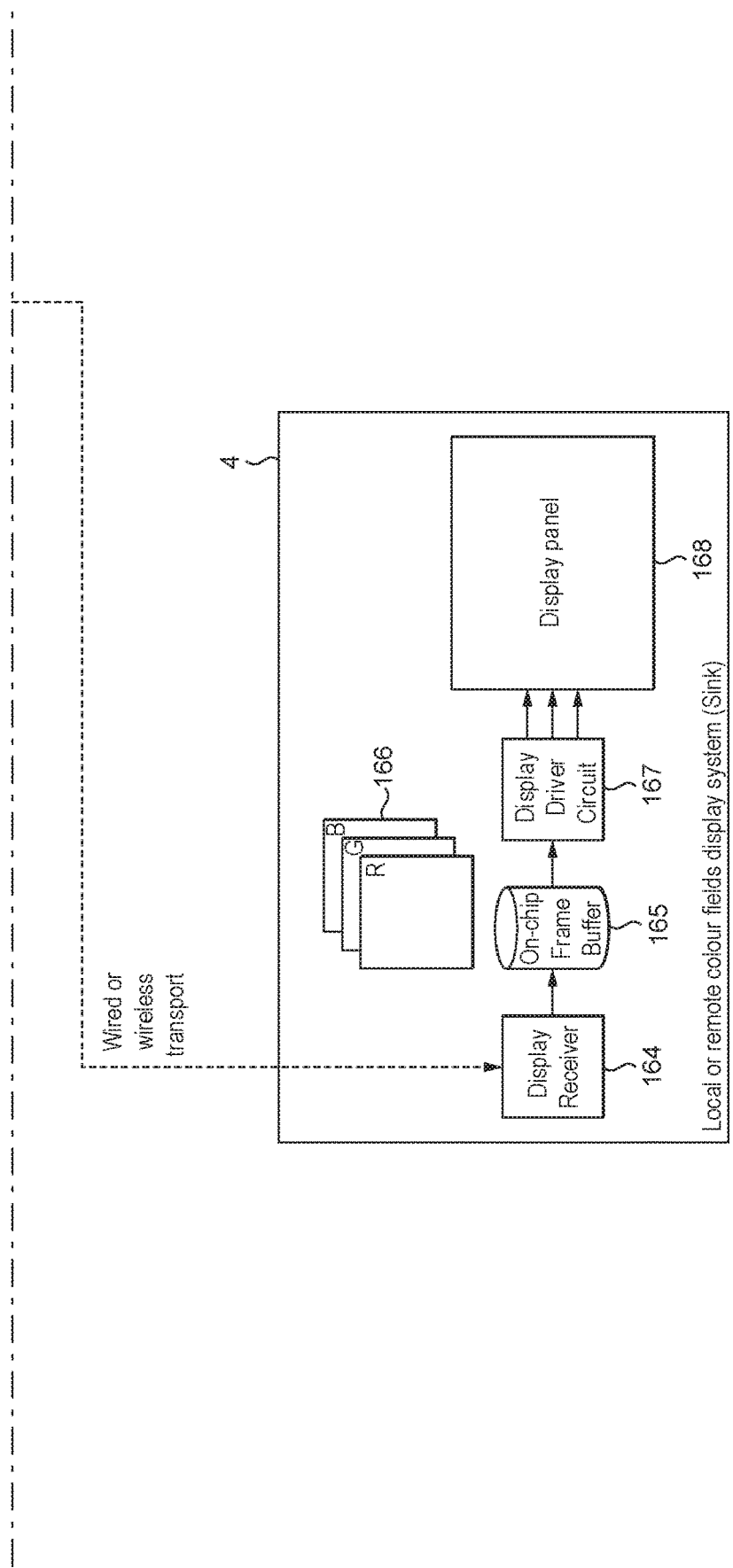

DATA PROCESSING SYSTEMS

BACKGROUND

The technology described herein relates to data processing systems, and in particular to the operation of data processing systems that display images on a display.

FIG. 1 shows an exemplary data processing system 14 that comprises a host processor comprising a central processing unit (CPU) 7, a graphics processing unit (GPU) 2, a video codec 1, a camera 12, an image signal processor (ISP) 13, a display processor 5, and a memory controller 8. As shown in FIG. 1 these units communicate via an interconnect and have access to off-chip memory 3. In this system the GPU 2, video codec 1, ISP 13 and/or CPU 7 will generate frames (images) to be displayed and the display processor 5 will then provide the frames to a display 4 for display. The display 4 may be local or remote to the remainder of the system, and may have a wired or wireless connection to the display processor 5.

In use of this system, an application such as game executing on the host processor (CPU) will, for example, require the display of frames on the display 4. To do this, the application 10 will submit appropriate commands and data to a driver 11 for the graphics processing unit 2 that is executing on the CPU 7. The driver 11 will then generate appropriate commands and data to cause the graphics processing unit 2 to render appropriate frames for display and to store those frames in appropriate frame buffers, e.g. in the main memory 3. The display processor 5 will then read those frames into a buffer for the display from where they are then read out and displayed on the display panel of the display 4.

The frames for display may also or instead be streamed to the display processor from the processing unit, e.g. the GPU 2 or ISP 13, that is producing the frames, e.g. through a cache, if desired.

An example of a use of a data processing system 14 such as that illustrated in FIG. 1 is to provide an augmented reality (AR) and/or virtual reality (VR) head-mounted display (HMD) system. (In this case, the display 4 will be a head-mounted display of some kind.)

In a head-mounted AR/VR display operation, the appropriate images to be displayed to each eye will, e.g., be rendered by the graphics processing unit 2, in response to appropriate commands and data from the application, such as a game, (e.g. executing on the CPU 7) that requires the augmented reality or virtual reality display. The GPU 2 will, for example, render the images to be displayed at a rate that matches the refresh rate of the display, such as 30 frames per second.

In such arrangements, the system will also operate to track the movement of the head/gaze of the user (so-called head pose tracking). This head orientation (pose) data is then used to determine how the images should actually be displayed to the user for their current head position (view direction), and the images (frames) are rendered accordingly (for example by setting the camera (view point) orientation based on the head orientation data), so that an appropriate image based on the user's current direction of view can be displayed.

While it would be possible simply to determine the head orientation (pose) at the start of rendering a frame to be displayed in an AR/VR system, because of latencies in the rendering process, it can be the case that the user's head orientation (pose) has changed between the head orientation (pose) at the beginning of the rendering of the frame and the time when the frame is actually displayed (scanned out to the display panel).

To allow for this, frames to be displayed are rendered based on the head orientation data sensed at the beginning of the rendering of the frames, but then before the frames are actually displayed, the frames are re-projected based on an expected head orientation for the time that the frames will actually be displayed to the user. The expected head orientation may be, e.g., based on predicted head movements of the user between the time the frame is rendered and when it will actually be displayed. The re-projected version of the frame is then displayed. This allows the image displayed on the display to more closely match the user's (predicted) current head orientation.

To do this processing, the initial "application" frames are rendered into appropriate buffers in the memory but there is then a second rendering process that takes the initial, application frames in memory and uses the predicted head orientation (pose) information to render "re-projected" versions of the initially rendered frames that take account of the expected head orientation to provide the frames that will be displayed to the user. This typically involves some form of transformation on the frames, based on the predicted head orientation (pose). The so-transformed (re-projected) rendered frames that are actually to be displayed may then be written into a further buffer or buffers in memory, from where they are then read out for display by the display processor.

The transformation (re-projection) of the initial frames based on the predicted head orientation (pose) may be carried out, e.g., by the graphics processing unit 2, and/or by the display processor 5 (where the display processor has appropriate transformation functionality), e.g. under appropriate control from the CPU 7. Thus, for this processing, the graphics processing unit 2 will render the "application" frames as required and instructed by the application, and then the graphics processing unit or the display processor, for example, will re-project those rendered frames appropriately based on predicted head orientation data for processing by the display processor 5 for display.

It is becoming increasingly common to use so-called "field sequential" colour displays, such as Liquid-Crystal-on-Silicon (LCos) displays, for head-mounted display systems, particularly for augmented reality (AR) headsets. This is because such displays can be physically very small, low power, and inexpensive, and lack the "screen door" issues in LCD and OLED panel types that have individual coloured subpixel elements.

A field sequential colour display is a display in which the different colour fields are displayed in successive images, rather than having display elements that display all three colour fields simultaneously. Thus, in a field sequential display, an, e.g., "red image" for a frame to be displayed will be displayed first, followed by a green image for the frame, followed by a blue image for the frame, relying on the human vision system to fuse the successive single colour images into a "full" colour image. Such field sequential displays generally require a combination of high frame rates and multiple colour fields displayed per frame to construct a stable image. A minimal set of colour fields per frame would be 3 (as RGB), but 4 colour fields (e.g. RGBG) and 6 colour fields (RGBRGB) per frame can also be used.

One issue with field sequential displays is so-called "colour break-up", where the individual colour fields become visible to the user. This may be a particular problem for AR headset use, where the user is moving and looking through a semi-transparent display to see a mix of the field sequential display output and the real world. The user's head motion across a single frame may, in effect, visibly spread the colour fields, thereby increasing the likelihood of colour break-up.

The Applicants accordingly believe that there is scope for improved arrangements for displaying images on field sequential colour displays, particularly when using such displays for head-mounted display systems and/or augmented reality applications.

BRIEF DESCRIPTION OF THE DRAWINGS

Various embodiments of the technology described herein will now be described by way of example only and with reference to the accompanying drawings, in which.

Like reference numerals are used for like components throughout the drawings, where appropriate.

DETAILED DESCRIPTION

Figure 1:
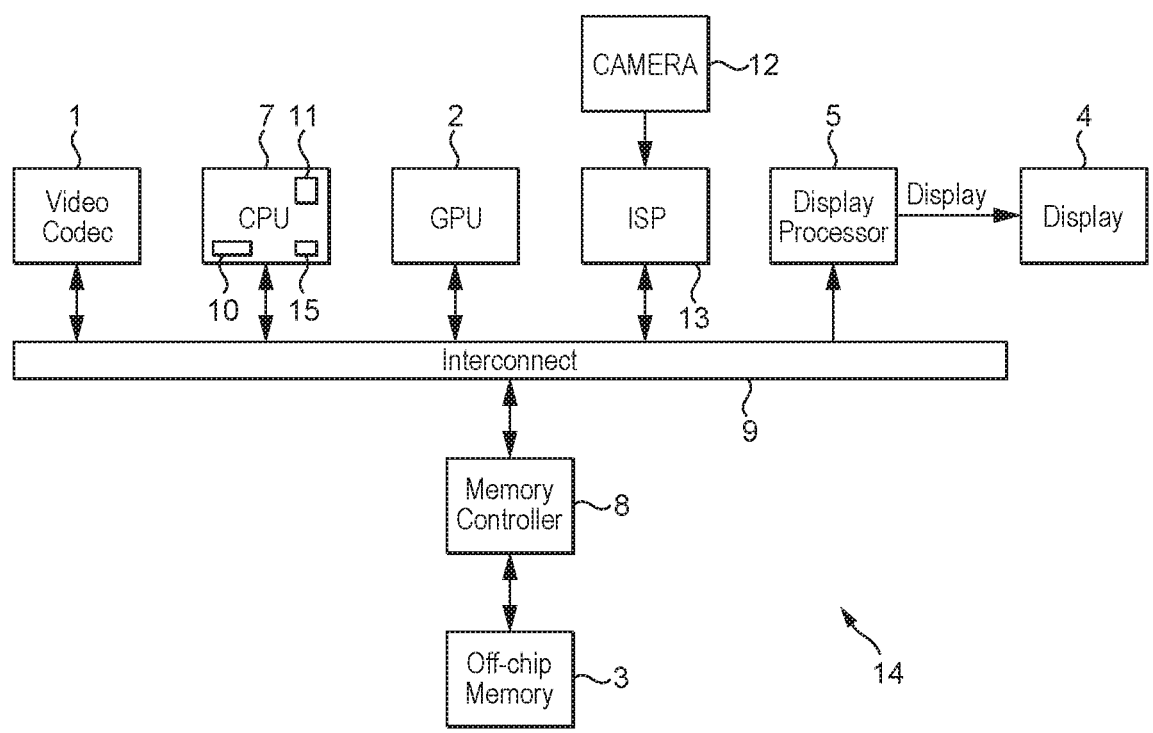
FIG. 1 shows an exemplary data processing system.

An embodiment of the technology described herein comprises a method of operating a data processing system, the data processing system comprising:
a field sequential colour display operable to display frames for display;
a producer processing unit operable to generate frames for display on the display;
a display processor operable to provide frames generated by the producer processing unit to the display for display; and
a transformation engine operable to transform a frame generated by the producer processing unit based on a view orientation to provide a view orientation transformed frame for display on the display;
the method comprising:
when displaying a frame generated by the producer processing unit that is to be transformed based on a predicted view orientation on the field sequential colour display:
the transformation engine transforming each colour field to be displayed on the display for the frame based on a predicted view orientation for that particular colour field, such that each colour field will be subjected to a different view orientation transformation to the other colour fields for the frame; and
displaying the so-transformed colour fields sequentially on the display to display the frame.

Another embodiment of the technology described herein comprises a data processing system comprising:
a field sequential colour display operable to display frames for display;
a producer processing unit operable to generate frames for display on the display;
a display processor operable to provide frames generated by the producer processing unit to the display for display; and
a transformation engine operable to transform a frame generated by the producer processing unit based on a view orientation to provide a view orientation transformed frame for display on the display;
wherein the transformation engine is configured to:
for a frame generated by the producer processing unit to be displayed on the field sequential colour display that is to be transformed based on a predicted view orientation:
transform each colour field to be displayed on the display for the frame based on a predicted view orientation for that particular colour field, such that each colour field will be subjected to a different view orientation transformation to the other colour fields for the frame; and
the data processing system is further configured to:
display the so-transformed colour fields sequentially on the display to display the frame.

The technology described herein relates to data processing systems that display images using a field sequential colour display (i.e. a display in which successive, separate colour fields are displayed to provide the overall colour image).

In the technology described herein, when a frame to be displayed on the field sequential colour display is to be transformed based on view orientation data (which may, e.g., be the case when providing an augmented reality display, for example), rather than simply transforming the frame to be displayed as a whole based, e.g., on a predicted view orientation for the frame as a whole, each colour field that will be displayed is subjected to its own, separate, view orientation-based transformation, based on a predicted view orientation for that particular colour field.

This then has the effect of the view orientation-based transformation taking account of the fact that each colour field will be displayed on the sequential display at a separate (and different) time. In other words, by transforming each colour field individually based on a predicted view orientation for that colour field, the particular time of display of the separate colour fields is allowed for and taken account of.

This can then provide a more accurate and visually acceptable display, particularly in the case of a head-mounted display where the user is moving during display of the frames. This may help to reduce and/or avoid colour break-up when using a colour field sequential display for a head-mounted display system, for example.

The field sequential colour display can be any suitable and desired form of field sequential colour display (i.e. a display in which images are displayed by displaying successive, separate, colour fields on the display successively (in turn)), such as a Liquid-Crystal-on-Silicon display.

The display can comprise any suitable and desired components and elements that a display may comprise, such as, and in an embodiment, a display panel, a display driver circuit for scanning respective colour field data to the display panel, and a display receiver for receiving data to be displayed on the display panel. The display driver circuit should be operable to provide the appropriate sequence of colour fields to the display panel for display to display a (and each) frame that is to be displayed. The display may also comprise appropriate local (on-chip) frame data storage, such as a frame buffer, e.g. where the separation into respective colour fields is performed by the display itself.

The producer processing unit that generates the frames for displaying on the field sequential colour display can comprise any processing unit of data processing system that is capable of generating frames for display. Thus it may comprise, for example, a graphics processor (graphics processing unit (GPU)), a video processor, a CPU, and/or an image signal processor (ISP), etc. There may be more than one producer processing unit operable to generate frames for display on the display, if desired. In an embodiment, the producer processing unit is a graphics processor.

Thus the frames for display are in an embodiment generated (rendered) by a graphics processing unit (a graphics processor) of the data processing system, but they could also instead be generated or provided by another component or components of the overall data processing system, such as a CPU, a video processor, or an ISP, if desired.

The frames that are generated for display can be any suitable and desired frames that it may be desirable to display. In an embodiment, the frames are frames that are generated for display for an application, such as a game, and in an embodiment for an augmented reality or virtual reality application.

Each frame will comprise an array of data elements (sampling positions) (e.g. pixels), for each of which appropriate data (e.g. a set of colour values) is stored.

The display processor can comprise any suitable and desired display processor that is operable to provide frames generated by a producer processing unit of the data processing system to the display for display. Thus the display processor should be operable to read data of frames from memory, perform appropriate "display processing" on those frames, and then provide the processed frames to the display for display. In an embodiment, the display processor provides the frames to the display for display via a "direct" connection to the display, i.e. is operable to stream the frames (the data for the frames) to the display, rather than transferring the frames to the display via memory for example. The display processor may have a wired or wireless connection to the display.

The display processor may also be operable to perform other processing operations on frames for display (as well as the operations necessary to provide the frames in a form suitable for display), such as compositing plural input frames to provide an output frame for display, etc.

In one embodiment, the frames generated by the producer processing unit are stored, e.g. in a frame buffer, in memory, from where they are then read by the display processor for processing by the display processor (and then providing to the display for display).

The memory where the frames are stored (prior to processing by the display processor) may comprise any suitable memory and may be configured in any suitable and desired manner. For example, it may be a memory that is on-chip with the display processor, or it may be an external memory. In an embodiment it is in external memory, such as a main memory of the overall data processing system. It may be dedicated memory for this purpose, or it may be part of a memory that is used for other data as well.

In another embodiment, the frames are streamed to the display processor (without intermediate storage in memory).

The transformation engine can transform the colour fields for a frame based on a predicted view orientation in any suitable and desired manner. In an embodiment, the predicted view orientation for a colour field is a desired view orientation (view position and/or direction) that the colour field in question is to be displayed as if viewed from (that the frame that is to transformed is to be displayed with respect to).

In an embodiment, the predicted view orientation is based on received view orientation data that indicates a "current" view orientation for the display. In an embodiment, this current view orientation data comprises head pose tracking data that, e.g., and in an embodiment, has been sensed from appropriate head pose tracking sensors of a display headset that the display is part of (and that the frames are to be displayed on).

Thus, in an embodiment, the transformation based on a predicted view orientation is based on and uses appropriately sampled head pose tracking data that is, e.g., and in an embodiment, periodically determined by a headset that the display is part of.

Thus, in an embodiment, the technology described herein comprises (and the data processing system is appropriately configured to) periodically sampling view orientation data (e.g. head pose data) (e.g., and in an embodiment, by means of appropriate sensors of a head-mounted display that the display is part of), and periodically providing sampled view orientation data and using the provided sampled view orientation data when transforming the colour fields for a frame to provide a transformed version of the frame for display.

The head pose tracking data that is sampled and used in this regard can comprise any suitable and desired head pose tracking data. In an embodiment, it is data that is indicative of a view direction and/or position (and in an embodiment both), and in an embodiment tracks one or more of, and in an embodiment all of: head rotation and head translation.

The head pose tracking data can be determined as desired. For example, it could be generated by an appropriate sensor, such as an inertial measurement unit (IMU) that is associated with the display, tracking system or a camera of the data processing system. In general, the sensed head pose data can be, and is in an embodiment, provided by a suitable system that can be queried at any point for a low latency, high accuracy source of head pose (in an embodiment rotation and position) data. The head pose tracking system could track rotation only, or rotation and position, or rotation and position and velocity, etc., as desired.

The predicted view orientation that the colour fields for a frame are transformed based on could comprise a predicted view position and/or a predicted view direction. In an embodiment, it comprises both a predicted view position and a predicted view direction.

In an embodiment, the sampled view orientation (e.g. head position and/or direction) is used together with information about the time when the respective colour fields for a frame will be displayed, to predict respective view orientations (e.g., and in an embodiment, view positions and/or directions) for the user when each colour field of the frame will actually be displayed, with the respective colour fields for the frame than being respectively transformed based on their respective predicted view orientations.

Thus, in an embodiment, a sensed view orientation (head pose) is used to predict a future view orientation for each colour field (plane) separately, based on the sensed view orientation and the time at which each colour field will be displayed. This prediction in an embodiment uses an estimate of the likely motion (e.g. rotation and/or translation) of the user's gaze from the time where the view orientation has been sampled to the time when the colour field will be displayed.

In an embodiment, the prediction uses one or more of, and in an embodiment all of: rotation, translation and estimated display time, to determine the predicted view orientation for the colour field in question.

Thus, in an embodiment, the predicted view orientation for a colour field of the frame is determined based on a sensed, in an embodiment current, view orientation (position and/or direction), and a prediction of the user's likely head movement (e.g., and in an embodiment, rotation and/or translation) from that sensed view orientation to the (estimated) time when the colour field in question will be displayed, to provide a predicted view orientation for the time when the colour field in question will be displayed, with the transformation engine then transforming the colour field in question based on that predicted view orientation.

The predicted head movement between the sensed orientation (head pose) and the time at which the colour field in question will be displayed can correspondingly be determined in any suitable and appropriate manner, for example, and in an embodiment, by tracking the user's head movement (e.g., and in an embodiment, rotation and/or translation and/or velocity) over a period of time, and using that tracking to then predict future head movement of the user. Other arrangements would, of course, be possible.

The actual determination of the predicted view orientation using the sensed head pose data can be performed in any suitable and desired component or element of the data processing system. Thus it may, for example, be generated in a suitable processor, such as a CPU, or other processor, of the data processing system. The determined predicted view orientations are in an embodiment then used to determine appropriate transformation parameters for the transformation engine, which parameters should then be made available appropriately for provision to the transformation engine, for example either to the driver for the display processor, and/or so as to be readable by the display processor directly.

Thus, in an embodiment, the data processing system further comprises a predicted view orientation generating engine that is operable to generate a predicted view orientation (predicted view orientation parameters) from one or more of, and in an embodiment all of: a sensed (current) view orientation (direction and/or position); a previously estimated display time (the time that the frame to be transformed was generated for); and a target display time (for the colour field in question (i.e. when the colour field is intended to be displayed)).

This engine in an embodiment then returns the necessary predicted view orientation parameters that the transformation engine needs to transform the colour field in question based on the predicted view orientation. This engine could, e.g., be part of CPU or other processor of the system, a standalone processor (engine) of the system, and/or associated with the display processor, etc.

This prediction could be done, e.g., and the transformation parameters provided, for a frame at any desired point in time, in an embodiment including within a frame (e.g. by taking advantage of "late breaking" tracking information within a frame). This could be implemented, e.g., on a CPU of the data processing system (e.g. for per-frame corrections), but there could also be a predicted view orientation determining engine closer to the display processor, e.g. where sub-frame corrections are desired.

In an embodiment, the producer processing unit is configured to generate a frame for display based on a currently sensed view orientation, with the transformation engine then transforming the (colour fields for the) frame that is rendered based on the sensed view orientation to new, predicted, view orientations based on the time when the individual colour fields will be displayed.

In the technology described herein, the transformation engine transforms each colour field to be displayed on the display for a frame based on a predicted view orientation for that particular colour field.

Thus, the transformation will, for each colour field separately, predict a view orientation for that particular colour field based, e.g., and in an embodiment, on the time that that colour field will be displayed. Thus, in the case where, for example, each frame is displayed as a sequence of three, RGB, colour fields, the transformation engine will operate to predict a view orientation for the red colour field, in an embodiment based on the time when the red colour field will be displayed, and transform the red colour field based on that predicted "red" view orientation, will predict a different view orientation for the green colour field, in an embodiment based on a predicted time that the green colour field will be displayed, and transform the green colour field based on the predicted "green" view orientation, and will predict a different view orientation for the blue colour field, in an embodiment based on a predicted time that the blue colour field will be displayed, and transform the blue colour field based on the predicted "blue" view orientation (and so on for the next frame, etc.).

In an embodiment, the operation in the manner of this embodiment of the technology described herein is used when displaying (only) three fields (so RGB) for each frame that is to be displayed.

It could also, if desired, be used when displaying more colour fields per frame (e.g. four colour fields per frame, e.g. RGBG). In this case, in an arrangement, the R and B colour fields are in an embodiment transformed based on predicted view orientations for when those fields are going to be displayed, but the duplicated colour field (green in this case) is in an embodiment transformed based on a predicted view orientation that is based on an average time for the display of the two "duplicated" (green in this case) colour fields.

In the case of six colour fields (RGBRGB) per frame, then again a respective average display time for each colour field could be used for the transformation, if desired (but in this case each colour field would still be subjected to its own respective (different) transformation based on a predicted "average" view orientation for that particular colour field).

The transformation engine in an embodiment updates its transformation operation based on new predicted view orientations for each frame that is to be displayed, such as at the beginning of each frame and/or colour field for a frame. The predicted view orientations for a frame are in an embodiment based on the latest sampled view orientation data (where available).

The transformation that the transformation engine (in effect) applies to the colour field of a frame based on the predicted view orientation can be any suitable and desired transformation. In general, it should, and in an embodiment does, comprise a 3D rotation of the 2D plane (image) (a perspective transform (a perspective projection after 3D transformation)/a 2D homography (an image-to-image homography)).

In an embodiment, the transformation is so as to transform the colour field to provide a representation of the colour field as if viewed from the predicted view orientation (view direction and/or position) (as compared, e.g., to the view orientation (view direction and/or position) that the frame was generated (rendered) with respect to by the producer processing unit). Thus, in an embodiment, the transformation engine operates to re-project the colour fields from the view orientation that they were produced with respect to, to their respective predicted view orientations.

The transformation engine may be implemented in any suitable and desired manner. It is in an embodiment provided by suitable processing circuitry (a suitable processing circuit). It may be provided, for example, by means of suitable programmable processing circuit/circuitry that can be programmed to operate in the desired manner, or provided as fixed function processing circuit/circuitry that is configured to perform in a required processing operation. Where fixed-function circuit/circuitry is used to perform the transformation operation, then that fixed-function circuit/circuitry is in an embodiment arranged to have limited configurability in use, such as it being possible to vary one or more control parameters for the operation that the circuit/circuitry performs, so as to facilitate some variation in the configuration of the operation of the fixed-function circuit/circuitry.

The transformation engine can be implemented and provided as desired in the data processing system. Thus it may be provided as a "standalone" transformation engine (transformation processor) of the data processing system, and/or could be provided by (as part of) an otherwise provided processor, component, etc., of the data processing system (that, e.g., and in an embodiment, has access to the frames that are to be displayed). In an embodiment, the transformation engine is provided as part of another component (e.g. processor) of the data processing system. In this case, the transformation engine could be provided in the display processor, and/or in the producer processing unit that is generating the frames for display. More than one element of the data processing system could comprise a suitable transformation engine, if desired.

In an embodiment, the transformation engine is provided in the display processor, and the predicted view orientation-based transformation is performed as part of the display processing that is performed by the display processor when processing a frame for providing to the display. In this case therefore, the display processor will include an appropriate transformation engine that is operable to transform frames generated by a producer processing unit based on a view orientation.

In this case, a view orientation-based transformation could be performed as a separate step in the display processor, but in an embodiment, it is performed as part of other display processing steps in the display processor. For example, where the display processor is already operable to perform chromatic aberration correction on frames to be displayed, then the view orientation transformation in the manner of the technology described herein could be performed in combination with (in conjunction with) the chromatic aberration correction. This will be particularly applicable where the display processor handles each colour channel separately in order to perform chromatic aberration correction, as in that case the colour fields will already, in effect, be separated, and so the respective separate predicted view orientation transformations can be applied more straightforwardly to the different colour channels.

Thus, in an embodiment, the transformation engine is implemented in the display processor and as part of the display processor processing operation, and in an embodiment as part of or in conjunction with a display processor processing operation that already handles each colour channel separately (such as chromatic aberration correction).

Correspondingly, in an embodiment, the transformation engine is operable to, and operates to, transform a (and each) colour field to be displayed on the display for a frame based on both a predicted view orientation for that particular colour field, and one or more other criteria (parameters), such as, and in an embodiment, one or more of, and in an embodiment all of: a chromatic aberration correction and a lens distortion correction.

The transformation engine in an embodiment operates to produce the output, predicted view orientation transformed colour fields on a sampling position-by-sampling position (e.g. pixel-by-pixel) basis, i.e. as a stream of predicted view orientation transformed sampling positions (pixels) (sampling position (pixel) values). This is in an embodiment done by the transformation engine generating the output predicted view orientation transformed colour fields by generating the data values for respective sampling positions (e.g. pixels) in the output predicted view orientation transformed colour fields from the data values for sampling positions (e.g. pixels) in the input frame.

In an embodiment, the transformation engine transforms a (and each) colour field by determining for a display data element (pixel) position in the frame to be displayed, the corresponding position (coordinate) in the colour field (plane) in question from which the data for that data element (pixel) pixel in the transformed output colour field should be taken.

In other words, the transformation engine in an embodiment determines the position in the input colour plane that will be moved to a given data element (pixel) position in the predicted view orientation transformed colour field by the transformation that the transformation engine applies.

This is in an embodiment done for plural, and in an embodiment for each, data element (pixel) position in the predicted view orientation transformed colour field that it is desired to generate (for display).

The transformation engine can determine which input colour plane position should be sampled for a given transformed output colour field data element (e.g. pixel) position in any suitable and desired manner.

In an embodiment, the transformation engine determines for an output transformed colour field data element (pixel) position x, y, the corresponding input colour plane position from which the data for that data element (pixel) position in the predicted view orientation transformed output colour field should be (is to be) taken, based on the predicted view orientation transformation that the transformation operation is to apply to that colour (field) plane, and one or more of, and in an embodiment all of: a lens distortion correction that the transformation engine is configured to apply to the input colour plane; and a chromatic aberration correction that the transformation operation is configured to apply to the input colour plane.

In an embodiment, the transformation engine determines for an output (display) sampling (pixel) position x, y, a corresponding input colour plane position (coordinate) (x', y') based on the lens distortion that the transformation operation is configured to take account of, and then modifies that determined colour plane position (coordinate) (x', y') based on the predicted view orientation for the colour field in question.

In an embodiment the determined input colour plane position (coordinate) is also modified to take account of chromatic aberration when viewing the output, transformed colour field (to apply a chromatic aberration correction). This is in an embodiment done before modifying the determined input colour plane position to be sampled based on the predicted view orientation.

Thus, in an embodiment, the transformation engine is configured to (and operates to) when transforming a frame based on predicted view orientation:

determine for a data element position in the output transformed frame that is to be output, a corresponding position in an input frame based on a defined lens distortion;

modify the determined input frame position to account for chromatic aberration when viewing the output transformed frame to provide at least one modified input frame position; and further modify the determined at least one modified input frame position based on a predicted view orientation to provide an output position in the input frame to be sampled to provide data to use for the data element of the output transformed frame.

In the case where the input frame is transformed as three colour planes (fields) together, then, in an embodiment the chromatic aberration correction stage is operable to determine separate chromatic aberrations for each different colour plane. Thus, in one embodiment, the process operates to determine an initial input frame position for the output transformed frame data element (sampling position) that is being generated based, e.g., and in an embodiment, on the lens distortion (as discussed above), but the chromatic aberration correction stage in an embodiment then determines plural (e.g., and in an embodiment three, one for each colour plane) modified input frame positions (coordinates) (that each account for a respective chromatic aberration).

In this case, the subsequent modification of the input frame position based on the predicted view orientation should be, and is in an embodiment, accordingly then respectively applied to each different input frame colour plane position provided by the chromatic aberration correction separately (and using the particular predicted view orientation for the colour field in question).

In this case therefore there will be (and is in an embodiment) plural (e.g. 3), positions to be sampled in the input frame for a given output transformed frame sampling position, e.g., and in an embodiment, one input frame position for each different colour plane (colour value) that is to be generated for the output transformed frame. Thus, for example, the set of RGB colour data for an output transformed frame data element (sampling position) will in an embodiment comprise a red value determined from one (a "red") input frame position (coordinate), a green value determined from another ("green") input frame position (coordinate), and a blue value determined from a third ("blue") input frame position (coordinate).

Once the position or positions in the input frame whose data is to be used for a data element (sampling position) in the output transformed frame has been determined, then in an embodiment, the input frame is sampled at the determined position or positions, so as to provide the data values to be used for the data element (sampling position) in the output transformed frame.

This sampling can be performed as desired, for example using bilinear filtering.

Once the colour fields for the frame have been transformed based on the predicted view orientations for the different colour fields (and otherwise processed to make them suitable for sending to the display for display), the frame may be, and is in an embodiment, sent to the display for display by the display processor. In an embodiment, the display processor sends the frame directly to the display for display, e.g., and in an embodiment, as a stream of data elements (pixels) for display. The data for the frame may be provided via a wired or wireless connection to the display, as desired.

The field sequential colour display will then operate to display the received frame, by displaying the different colour fields for the frame in turn (e.g., and in an embodiment, in the normal manner of operation for the display in question). Thus, the data elements (pixels) for each colour field will be appropriately scanned onto the panel of the display, to display the colour field in question (and so on for the other colour fields making up the overall frame to be displayed).

The display processor may provide the data for the frame to be displayed to the field sequential colour display as combined (e.g. interleaved) red, green and blue colour data. In this case, the colour data would then have to be separated into the respective, separate colour fields (planes) for display in the display (unit) itself. (Thus the display will first separate the received frame data from the display processor into the respective separate colour fields for display, before displaying those fields.)

In this case, the display could, for example, be provided with appropriate local storage, such as an on-chip frame buffer, for storing the frame data received from the display processor so as to facilitate separating that data into the respective separate colour fields on the display itself.

In an embodiment, the display processor is operable to provide the data for a frame to the display for display already separated into the respective separate colour fields (planes). In this case therefore, the display processor would provide, e.g., and in an embodiment, in sequence, a set of a first, e.g. red, colour data corresponding to one, e.g. the red, colour field (plane) for the frame, followed by a set of second, e.g. green, colour data corresponding to another, e.g. the green, colour field (plane) for the frame, followed by a set of third, e.g., blue, colour data corresponding to the next, e.g. blue, colour field (plane) for the frame (and so on, where each frame is to be displayed as more than three fields).

In this case, the frame data would be provided to the display as a sequence of colour planes (fields) (e.g., and in an embodiment, at the field refresh frequency), such that the received colour planes (fields) could then be passed directly to the display (e.g. driver circuit) for display on the display panel, without, e.g., there being any need to buffer the frame data on the display unit to allow it to be separated into the respective colour fields. This would then remove the need to provide the ability for the colour data for the frame to be separated into the respective colour fields (planes) in the display unit itself, thereby, for example, avoiding the need to provide an on-chip frame buffer in the display (unit) itself for that purpose.

While it would be possible if desired to configure the display processor to generate the separate colour planes for providing to the display in these arrangements (and in one embodiment, that is what is done), in an embodiment the display processor receives the frames for processing already separated into the respective colour planes (fields), and then processes the frames for display as separate colour planes (fields). In this case, the display processor will then, in effect, process a frame as respective separate planar (single) colour images.

In order to facilitate this operation, the producer processing unit that is generating the frame for display is in an embodiment accordingly configured to provide frames for processing by the display processor separated into single colour (planar) images (fields). This is in an embodiment achieved by having the producer processing unit write the frame data as (into) separate colour planes when writing a generated frame to the frame buffer from which it will be read by the display processor for processing (rather than writing the frame as interleaved red, green and blue colour values, for example).

This may be achieved as desired. For example, and in an embodiment, the memory write-out process for the producer processing unit could be, and is in an embodiment, configured to write a frame out to memory as respective separate colour planes. In the case of a graphics processor, for example, and in particular a tile-based graphics processor, this could be achieved by configuring the tile write-out process to write the data values for a tile out to respective separate colour planes in memory.

Other arrangements would, of course, be possible.

Thus, in an embodiment, the producer processing unit is operable to (and operates to), when generating a frame for display on the field sequential colour display, provide the generated frame that is to be processed by the display processor for providing to the display for display as separate colour planes.

In such an embodiment, the producer processing unit generates the frame for display in the normal manner (e.g. renders the frame as normal in the case of a graphics processor), but then when writing the frame data to memory for use by the display processor, stores the frame data as three separate colour planes, RGB.

In this case, the display processor will then process the frame for display as respective separate, single-colour planes. The display processor will, accordingly, read and process each colour plane from memory in turn. Thus, it will, for example, and in an embodiment, read and process a first, e.g., the red, colour plane for the frame, and then read and process a second, e.g. the green, colour plane for the frame, and then read and process the third, e.g. the blue, colour plane for the frame.

It is believed that having a producer processing unit provide frames for display as separate colour planes, with the display processor then processing the separate colour planes as separate colour planes for providing to a field sequential colour display for display, may be new and advantageous in its own right, and not just when transforming the different colour planes (fields) separately in the manner of the first embodiments of the technology described herein. For example, such an arrangement may in any event be able to reduce end-to-end latency when displaying frames on a field sequential colour display, and/or reduce the area cost of such a system by, e.g., avoiding the need to include a frame buffer in the display unit itself.

Thus, a further embodiment of the technology described herein comprises a method of operating a data processing system, the data processing system comprising:
a field sequential colour display operable to display frames for display;
a producer processing unit operable to generate frames for display on the display; and
a display processor operable to provide frames generated by the producer processing unit to the display for display;
the method comprising:
when displaying a frame generated by the producer processing unit on the field sequential colour display:
the producer processing unit providing the frame for processing by the display processor in the form of separate colour planes;
the display processor processing each colour plane provided by the producer processing unit separately, and providing the separate colour planes as separate colour planes to the display for display; and
the display displaying the separate colour planes for the frame.

A further embodiment of the technology described herein comprises a data processing system comprising:
a field sequential colour display operable to display frames for display;
a producer processing unit operable to generate frames for display on the display; and
a display processor operable to provide frames generated by the producer processing unit to the display for display;
wherein:
the producer processing unit is configured to, when generating a frame to be displayed on the field sequential colour display, provide the frame for processing by the display processor in the form of separate colour planes;
the display processor is configured to process each colour plane provided by the producer processing unit as a separate colour plane, and to provide the separate colour planes as separate colour planes to the display for display; and
the display is configured to display the separate colour planes for the frame received from the display processor.

As will be appreciated by those skilled in the art, these embodiments of the technology described herein can, and in an embodiment do, include any one or more or all of the features of the technology described herein.

Thus, for example, the system in an embodiment further comprises a transformation engine that transforms the frames generated by the producer processing unit based on view orientation (and in an embodiment does that for each colour plane separately). Correspondingly, the method in an embodiment comprises transforming the frames generated by the producer processing unit based on a view orientation, and, again, in an embodiment transforming each colour plane based on its own, particular view orientation.

It should also be noted here that although the display processor will in these cases process a given frame as three separate colour planes, the display processor can still work with and provide to the display for display any desired colour field pattern (e.g. RGB, RGBG, RGBRGB, etc.), e.g. simply by processing the separate colour plane input data in the appropriate manner to generate the required field pattern.

In these embodiments, the display processor can be configured to process a frame as respective separate colour planes in any suitable and desired manner.

Thus, for example, where the display processor includes respective colour processing pipelines for performing the display processing operations on the different colour channels of a sampling position (pixel) in a frame, then the display processor could operate to, rather than working on the three different colour channels (RGB) from a single frame pixel in a given cycle, simply use the appropriate colour processing pipeline for the colour plane that it is processing to process a single pixel from that colour plane in a given cycle. In this case therefore, the other two colour pipelines that were not being used could be, and are in an embodiment, disabled.

However, in an embodiment, where the display processor is capable of processing the three colour samples of a pixel simultaneously in a single cycle by having three different colour processing pipelines operating in parallel, then when operating in the manner of the embodiments of the technology described herein where a single colour plane for a frame is being processed for display, in an embodiment the display processor is operable to use each of its colour processing pipelines to process a given sampling position (pixel) from the colour plane in question.

In this case therefore, rather than processing the three colour channels of a single data element (pixel) in parallel, the display processor would operate to process three different data elements (pixels) from the single colour plane (field) in question simultaneously. Thus, in the case of the red colour plane, for example, the display processor would read and process three data elements (pixels) from the same colour plane simultaneously, by processing one data element (pixel) with the red colour pipeline, one data element (pixel) with the green colour pipeline, and one data element (pixel) with the blue colour pipeline.

This would then facilitate processing the separated colour planes for a frame at a similar rate to the rate at which the display processor could process non-colour separated frames.

In this case, the display processor is accordingly in an embodiment configured to fetch data element (pixel) data in sets of three neighbouring pixels from the same colour plane. Thus the display processor is in an embodiment configured to read three consecutive data value (data element) memory positions from the colour plane in question. This can be achieved in any suitable and desired manner.

In the case where the transformation engine transforms a (and each) colour field by determining for a display data element (pixel) position in the output frame to be displayed, the corresponding position (coordinate) in the (input) colour field (plane) in question from which the data for that data element (pixel) pixel in the transformed output colour field should be taken, then this operation is in an embodiment configured to, when the display processor is processing single colour planes, for a respective display data element (pixel) position in the frame to be displayed, as well as determining the corresponding position (coordinate) in the (input) (single) colour plane in question from which the data for that data element (pixel) in the transformed output colour field should be taken, also determine one or more further positions (coordinates) in the (input) single colour plane from which data should be taken for one or more further, and in an embodiment for two more, data elements (pixels) (positions) in the output transformed colour field.

Thus, in an embodiment, for a given display pixel (coordinate) that is processed, the transformation engine operates to generate three sampling (pixel) positions within the single colour plane that is currently being processed.

This is in an embodiment achieved by generating one input colour plane pixel position corresponding to the output display pixel position (coordinate) being considered, another input colour plane pixel position corresponding to the next display (output) pixel position (coordinate) to the output display pixel position (coordinate) being considered along a particular axis direction (row or column) of the display (output) pixel coordinates, and another input colour plane pixel position corresponding to the next but one display (output) pixel position (coordinate) to the output display pixel position (coordinate) being considered along the particular axis direction (row or column) in question.

This is in an embodiment done for every third data element (pixel) position (along the particular axis direction) in the predicted view orientation transformed colour field that it is desired to generate (for display) (as each display pixel position that is considered will trigger the generation of three output pixels). (Thus the display (output) pixel coordinates (positions) that are used for the transformation operation are also correspondingly in an embodiment configured to trigger the selection and generation of input colour plane pixel coordinates corresponding to groups of three successive display pixel coordinates.)

In these arrangements, in an embodiment the chromatic aberration correction stage is operable to generate the three (adjacent) data element (pixel) positions to be sampled (i.e. the chromatic aberration correction stage determines three input colour plane positions (coordinates) (that each correspond to a respective different output (pixel) position in the output view orientation transformed colour field (plane) in question).

The subsequent modification of the input colour plane positions based on a predicted view orientation should be, and is in an embodiment, accordingly then respectively applied to each different input colour plane position (e.g. provided by the chromatic aberration correction) separately (and in an embodiment using a predicted view orientation that is specifically for the colour field in question (as discussed above)).

In this case therefore there will be (and is in an embodiment) plural (e.g. 3), positions to be sampled in the input single colour plane (field) generated for a (and each) output transformed frame sampling (pixel) position that is considered.

Thus, in an embodiment, the transformation engine is configured to (and operates to), when transforming a single colour plane for a frame to be displayed based on a predicted view orientation:

determine based on a data element position in the output transformed frame that is to be output, a corresponding position in the input colour plane to that data element position in the output transformed frame, and two further positions in the input colour plane that correspond to two other (and in an embodiment successive to the data element position in the output transformed frame) data element positions in the output transformed frame; and modify the three determined input colour plane positions based on a predicted view orientation to provide three output positions in the input colour plane to be sampled to provide data to use for the three data element positions of the output transformed frame.

Once the positions in the input colour plane whose data is to be used for the data elements (sampling positions) in the output transformed colour plane (field) have been determined, then the input colour plane can be sampled at the determined positions, so as to provide the data values to be used for the data elements (sampling positions) in the output transformed colour plane (field).

Where the display processor processes a frame in the form of (as) separate single colour planes (fields), then any colour-specific processing that is being performed, such as any chromatic aberration correction, should be, and is in an embodiment, configured (set) appropriately for the colour plane that is currently being processed, and/or disabled.

Equally, any process that is applied in normal operation to the three colour channels should correspondingly be disabled and/or modified to take account of the fact that a single colour plane is being processed. For example, the three RGB distortion meshes (if used) should be interpreted as a single channel distortion mesh, but fitted to the (n×3+0), (n×3+1) and (n×3+2) rows or columns (depending on the scan order), respectively.

Although the technology described herein has been described above with particular reference to the generation and processing of a single frame, as will be appreciated by those skilled in the art, the operation in the manner of the technology described herein is in an embodiment performed for plural frames that are to be displayed, and in an embodiment for each frame of a sequence of plural frames that is to be displayed. Thus, in an embodiment, the operation in the manner of the technology described herein is used to generate a sequence of plural output frames for display to a user, and correspondingly, the operation in the manner of the technology described herein is in an embodiment repeated for plural output frames to be displayed.

Thus, for example, a producer processing unit will produce a sequence of plural output frames to be displayed, with the transformation engine and display processor then processing those frames appropriately to provide them to the display for display.

The generation and processing of the frames for display may also, accordingly, and in an embodiment, comprise generating a sequence of "left" and "right" frames (colour fields for the frames) to be displayed to the left and right eyes of the user, respectively. Each pair of "left" and "right" frames for display may be generated from a common input frame, or from respective "left" and "right" input frames, as desired.

In an embodiment, the display of the technology described herein comprises a head-mounted display, e.g., and in an embodiment, for virtual reality and/or augmented reality display. In this case, the display should, and in an embodiment does, accordingly comprise a display panel for displaying the frames to the user, and a lens or lenses through which the user will view the displayed frames.

Correspondingly, in an embodiment, the display has associated view orientation determining (e.g. head tracking) sensors, which, in an embodiment periodically, generate view tracking information based on the current and/or relative position of the display, and are operable to provide that view orientation periodically to processing units of the data processing system, e.g., in an embodiment, for use when transforming frames based on view orientation.

Thus, another embodiment of the technology described herein comprises a head-mounted display device comprising the data processing system of any one or more of the embodiments of the technology described herein. Correspondingly, another embodiment of the technology described herein comprises a method of operating a head-mounted display device, comprising operating a head-mounted display device in the manner of any one or more of the embodiments of the technology described herein.

As well as the particular units and components required for operation in the manner of the technology described herein, the data processing system may, and in an embodiment does, also comprise one or more of, and in an embodiment all of, any other suitable and desired component, unit, processor, etc., that a data processing system may comprise. Thus the data processing system may comprise one or more of, and in an embodiment all of: a central processing unit, a graphics processing unit, a video processor, an image signal processor, a camera, a system bus, and a memory controller. In an embodiment, the data processing system comprises and/or is in communication with, one or more memories and/or memory devices that store data described herein, and/or software for performing the processes described herein.

In an embodiment, the data processing system comprises, and/or is in communication with, one or more memories and/or memory devices that store the data described herein, and/or that store software for performing the processes described herein. The data processing system may also be in communication with the host microprocessor, and/or with a display for displaying images based on the output of the data processing system.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, engines, stages, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuits/circuitry), and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, etc., if desired.

Furthermore, any one or more or all of the processing stages and engines of the technology described herein may be embodied as processing stage circuitry (circuits), e.g., in the form of one or more fixed-function units (hardware) (processing circuitry (circuits)), and/or in the form of programmable processing circuitry (circuits) that can be programmed to perform the desired operation. Equally, any one or more of the processing stages and processing stage circuitry of the technology described herein may be provided as a separate circuit element to any one or more of the other processing stages or processing stage circuitry (circuits), and/or any one or more or all of the processing stages and processing stage circuitry (circuits) may be at least partially formed of shared processing circuitry (circuits).

It will also be appreciated by those skilled in the art that all of the described embodiments of the technology described herein can, and in an embodiment do, include, as appropriate, any one or more or all of the features of the technology described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising software code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display controller, or microprocessor system comprising a data processor causes in conjunction with said data processor said controller or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A number of embodiments of the technology described herein will now be described.

The present embodiments relate to the process of displaying frames to a user in a head-mounted display system, such as for an augmented reality (AR) display.

Such a system may be configured as shown in FIG. 1 (and described above), with the display 4 of the system comprising an appropriate head-mounted display that includes, inter alia, a display screen or screens (panel or panels) for displaying frames to be viewed to a user wearing the head-mounted display, one or more lenses in the viewing path between the user's eyes and the display screens, and one or more sensors for tracking the pose of the user's head (their head position and/or their view (gaze) direction) in use (while images are being displayed on the display to the user).

In the present embodiments, the display 4 is in the form of a field sequential colour display, such as an LCoS (Liquid-Crystal-on-Silicon) display.

Figure 5:
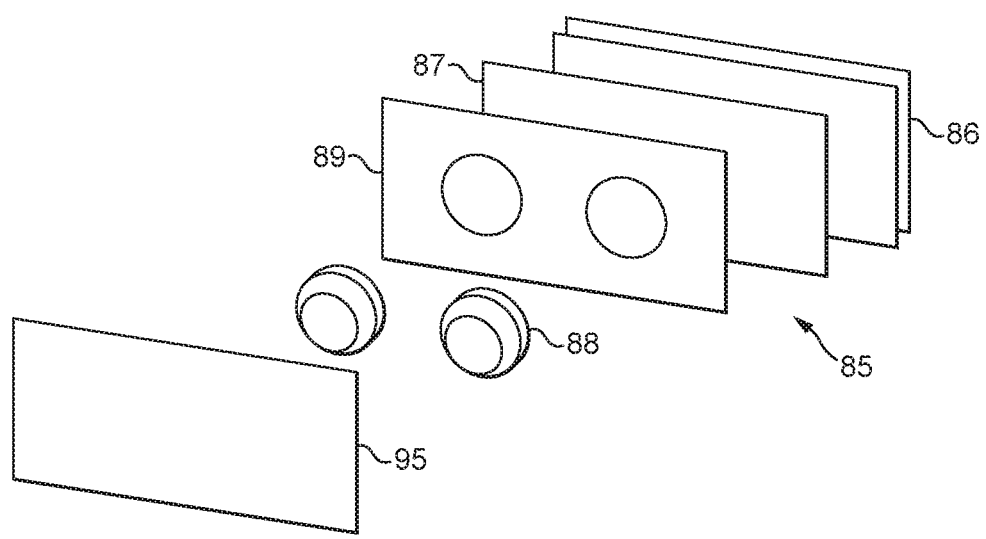
FIG. 5 shows schematically an exemplary virtual reality head mounted display headset.

FIG. 5 shows schematically an exemplary virtual reality head-mounted display 85. As shown in FIG. 5, the head-mounted display 85 comprises, for example, an appropriate display mount 86 that includes one or more head pose tracking sensors, to which a display screen (panel) 87 is mounted. A pair of lenses 88 are mounted in a lens mount 89 in the viewing path of the display screen 87. Finally, there is an appropriate fitting 95 for the user to wear the headset.

In the system shown in FIG. 1, the display processor 5 will operate to provide appropriate images to the display 4 for viewing by the user. The display processor 5 may be coupled to the display 4 in a wired or wireless manner, as desired.

Images to be displayed on the head-mounted display 4 will be, e.g., rendered by the graphics processor (GPU) 2 in response to requests for such rendering from an application 10 executing on a host processor (CPU) 7 of the overall data processing system and store those frames in the main memory 3. The display processor 5 will then read the frames from memory 3 as input surfaces and provide those frames appropriately to the display 4 for display to the user. As the display 4 is a field sequential colour display, each frame will be displayed by displaying separate colour fields (planes) for the frame in turn on the display (e.g. as RGB, RGBG, or RGBRGB).

In the present embodiments, and in accordance with the technology described herein, the display processor 5 is operable to be able to transform frames based on a predicted view direction before providing those frames to the display 4 for display to a user.

Figure 6:
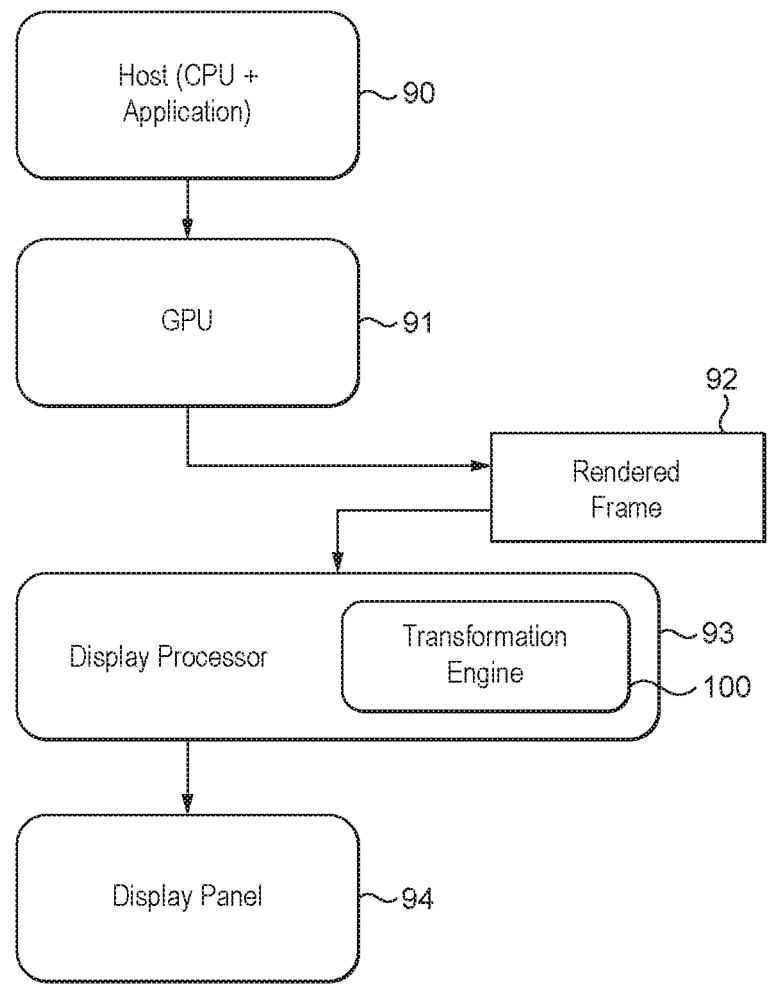
FIG. 6 shows schematically the provision of frames for display in an embodiment of the technology described herein.
Figure 7:
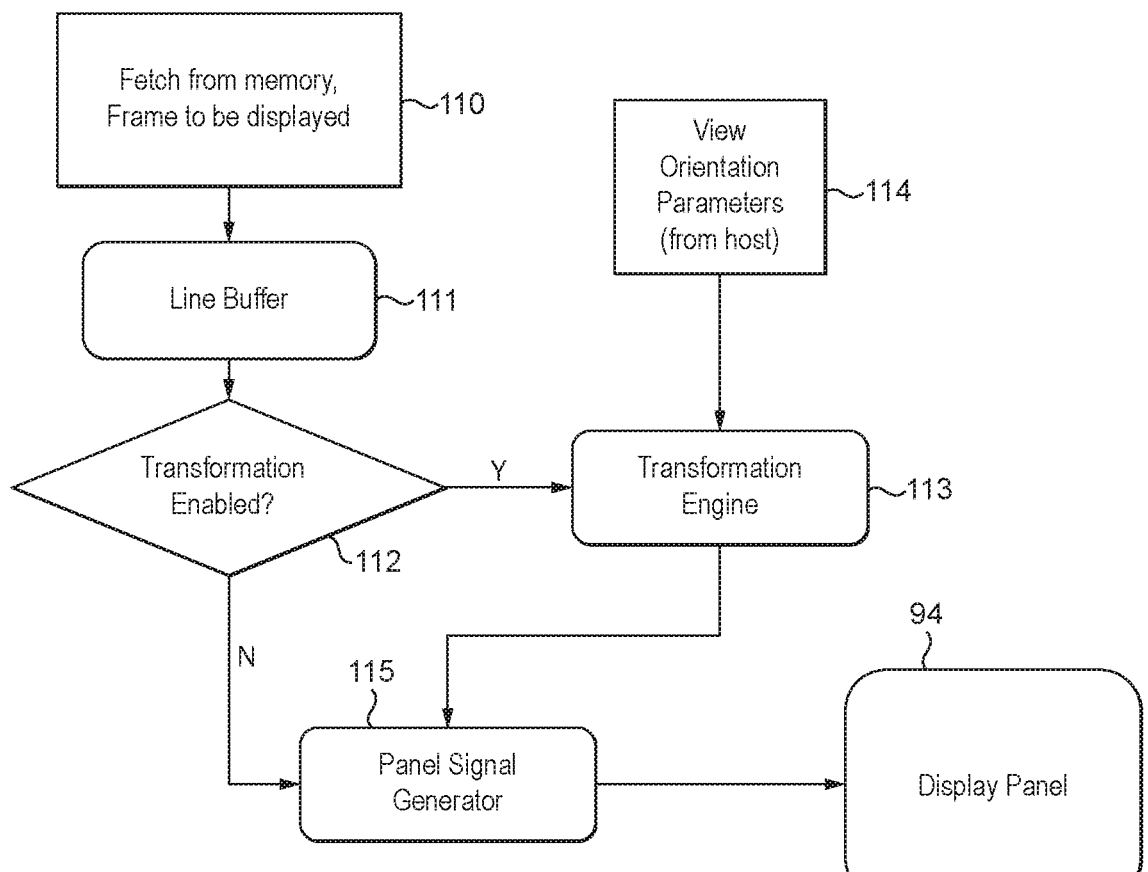
FIG. 7 shows schematically the provision of frames for display in an embodiment of the technology described herein in more detail.

FIGS. 6 and 7 illustrate this.

As shown in FIG. 6, the display processor 93 includes a transformation engine 100 that is operable to transform a rendered frame 92 generated by the graphics processor (GPU) 91 (e.g.) based on view orientation for provision to the display panel 94.

FIG. 7 shows the operation of the display processor when performing the view orientation transformation processing. As shown in FIG. 7, the rendered frame 92 to be displayed is first fetched from the memory (step 110) and then loaded into an appropriate buffer, such as a line buffer, of the display processor 93 (step 111).

It is then determined whether the view orientation transformation processing is enabled (step 112). (If the transformation processing is not enabled, then the loaded input frame is provided to the display 94 for display in the normal manner.)

If the view orientation transformation processing is enabled, then the fetched input frame is processed by a transformation engine of the display processor on the basis of appropriate view orientation parameters 114 provided from the host processor 90, to provide an appropriately "re-projected" version of the frame to be displayed (step 113). The "re-projected" frame is then provided to the remainder of the display processing pipeline (to the panel signal generator 115) for provision to the display 94 for display.

The configuration of the display processor 5 for performing the view orientation transformation operation, and the process of this operation, in the present embodiments, will now be described in more detail.

Figure 2:
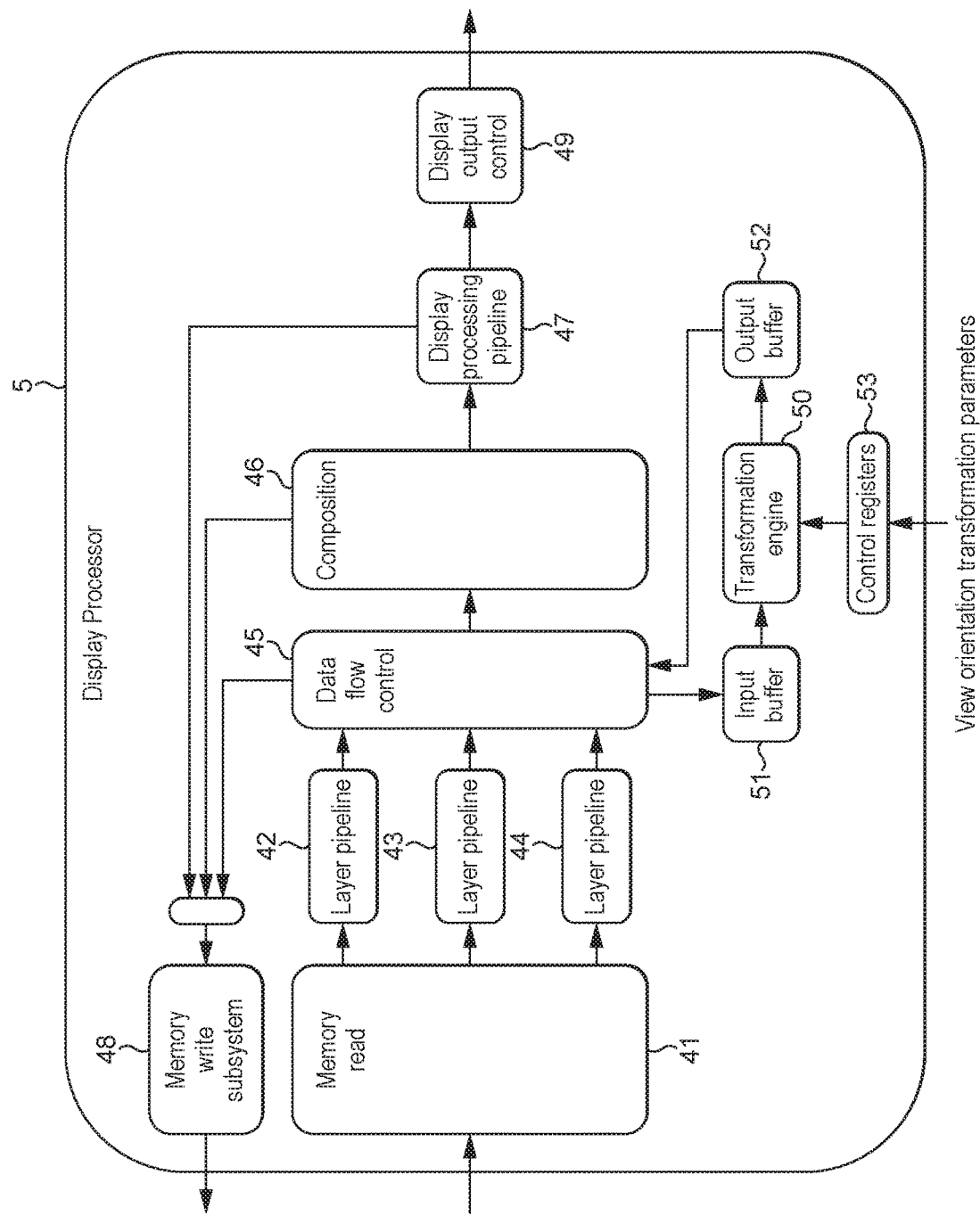
FIG. 2 shows schematically a display processor that can be operated in accordance with an embodiment of the technology described herein.

FIG. 2 shows schematically the display processor 5 in more detail. In FIG. 2, the boxes represent functional units of the display processor, while the arrowed lines represent connections between the various functional units.

As shown in FIG. 2, the display processor 5 comprises a memory read subsystem 41 that includes, inter alia, a read controller in the form of a Direct Memory Access (DMA) read controller. The read controller is configured to read one or more input surfaces from one or more frame buffers in the main memory 3 (not shown in FIG. 2) via the memory bus 9.

The memory read subsystem 41 further comprises one or more real-time FIFO (first-in-first-out) modules which are used to buffer locally the one or more input surfaces as they are read from memory, e.g. for latency hiding purposes.

In this embodiment, the memory read subsystem 41 is configured to provide (read) up to three different input surfaces for use as input layers which are to be used to generate a composited output frame. The three input layers may comprise one or more video layers, e.g. generated by the video processor (codec) 1, and one or more graphics layers, e.g. graphics windows generated by the graphics processing unit (GPU) 2, and so on. Hence, FIG. 2 shows the display processor 5 comprising three layer pipelines 42, 43, 44 which will each receive data from an input surface to be used as a display layer. Any or all of the input surfaces received by the layer pipelines may have been subjected to decoding by a decoder and/or rotation by a rotation unit, if desired.

Each layer pipeline 42, 43, 44 performs appropriate operations on the received surfaces, such as pixel unpacking from the received data words, colour (e.g. YUV to RGB) conversion, and inverse gamma or inverse sRGB correction.

Although the embodiment of FIG. 2 illustrates the use of three layer pipelines (and therefore up to three input layers), it will be appreciated that any number of layer pipelines may be provided and used in the technology described herein, depending on the application in question (and also depending on any silicon area constraints, etc.).

The display processor 5 further comprises a composition unit (display compositor) 46 that can receive inputs from the layer pipelines 42, 43, 44 and operates to compose the received input layers to generate a composited output surface, e.g. by appropriate alpha blending operations, etc.

The composited output frames from the composition unit 46 are onwardly transmitted to a display processing (post-processing) pipeline 47 for display, and/or to a memory write sub-system 48, as desired.

The display pipeline 47 is configured to selectively carry out any desired processing operation(s) on the composited output surface (frame), and to then transmit the (processed) composited output frame for appropriate display on the associated display.

The display processing pipeline 47 may, for example, comprise a colour conversion stage operable to apply a colour conversion to the composited output frame, a dithering stage operable to apply dithering to the composited output frame, and/or a gamma correction stage operable to carry out gamma correction on the composited output frame.

The display processing pipeline 47 also comprises appropriate display timing functionality. Thus, the display processing pipeline 47 is configured to send pixel data to the display outputs 49 with e.g. appropriate horizontal and vertical blanking periods. For example, horizontal and vertical synchronization pulses (HSYNC, VSYNC) may be generated together with a DATAEN signal which is asserted in non-blanking periods. In blanking periods DATAEN is de-asserted and no data is sent to the display (there are 4 blanking periods: horizontal front porch—before the HSYNC pulse, horizontal back porch—after the HSYNC pulse, vertical front porch—before the VSYNC pulse, and vertical back porch—after the VSYNC pulse).

It would also be possible to use other display timing and data (pixel) packing schemes, such as MIPI DPI, HDMI, Display Port, etc., if desired.

The display output 49 may, e.g. interface with a local display of the data processing system (e.g. of the mobile device, smart phone, tablet, etc., that the data processing system is part of).

The display processing pipeline 47 and display output control interface 49 accordingly act as an output stage for the display processor 5 for providing output frames for display to the display 4.

The memory write subsystem 48 of the display processor 5 is operable to write surfaces, e.g. generated by the composition unit 46, that it receives, out to external memory 3 (a frame buffer in external memory 3) via a memory bus. This then allows the display processor 5 to, as well as providing output frames for display, also write those output frames to main memory, if desired. To facilitate this operation, the memory write subsystem 48 includes a DMA write controller. In the present embodiment it also comprises appropriate FIFOs to act as latency hiding buffers.

The display processor 5 also includes a data flow control module 45 that is operable to direct the data flows through the display processor, i.e. to provide the input layers, composited output surfaces, etc., to the appropriate units for processing as shown in FIG. 2. In the present embodiment, the data flow controller 45 operates under appropriate software control, e.g., and in an embodiment, from a driver 11 for the display controller that is running on a host processor (e.g. the CPU 7) of the overall data processing system that the display processor 5 is part of. The driver may generate appropriate commands for the data flow controller 45 and program control registers of the display processor 5 in response to, e.g., commands and data for display processing received from an application running on the host processor.

Other arrangements in this regard, would, of course, be possible.

As discussed above, when the display processor 5 is to provide an output frame for display, it will read in data of one or more input surfaces (frames) that have been generated, e.g., by video codec 1 and/or GPU 2, and which are stored in respective frame buffers in the main memory 3, to act as input layers in its output frame generation process, process that input surface (frame) data (e.g. by compositing it into an output frame) and provide the (composited) output frame to the display 4 for display via the display processing pipeline 47.

This process is repeated for each frame that needs to be displayed, e.g. at a rate corresponding to the desired frame rate for the display 4, such as 60, 90, 120 or 240 frames per second for a colour field sequential display.

As shown in FIG. 2, the display processor 5 of the present embodiments further includes a transformation engine 50 that has an associated input buffer 51 and an associated output buffer 52. The transformation engine 50 is operable to transform an input surface (frame) that it receives via the input buffer 51 to provide an appropriately view orientation transformed version of that input surface (frame), which is then provided via the output buffer 52 to the display for display.

The required input surface (frame) data is loaded into the input buffer 51 by the driver controlling the memory read subsystem 41 to read appropriate data for the input surface from the main memory and provide it to the layer pipelines for provision by the data flow control module 45 to the input buffer 51.

As shown in FIG. 2, the data flow control module 45 is operable to direct input surface data processed by the layer pipelines 42, 43 and/or 44 appropriately to the input buffer 51 for processing by the transformation engine 50, and to then direct data from the output buffer 52 appropriately to the composition unit 46 and thence to the display processing pipeline 47 for display. This may again be appropriately controlled and configured by the driver.

The data flow control module 45 can also direct data of the transformed frame to the memory write subsystem 48 for writing out to external memory, if desired. This may be appropriate where subsequent frames for display are generated based on differences with previous frames.

Although the input buffer 51 and output buffer 52 are shown as separate buffers in FIG. 2, those buffers could also be provided via other buffers that may be present in the display processor 5, if desired, such as buffers that may be present in the layer pipelines, for example.

As shown in FIG. 2, the transformation engine 50 also has an associated set of control registers 53 via which appropriate control parameters for the transformation process can be set, e.g., and in an embodiment, under the control of the driver 11. As shown in FIG. 2, the registers receive and store, inter alia, view orientation transformation parameters that are set by the driver for the display processor. Other control parameters, for example indicative of the lenses and/or any other configuration parameters of the head-mounted display, may also be stored in the registers 53 so as to control the operation of the transformation engine 50.

Other arrangements would, of course, be possible.

Figure 3:
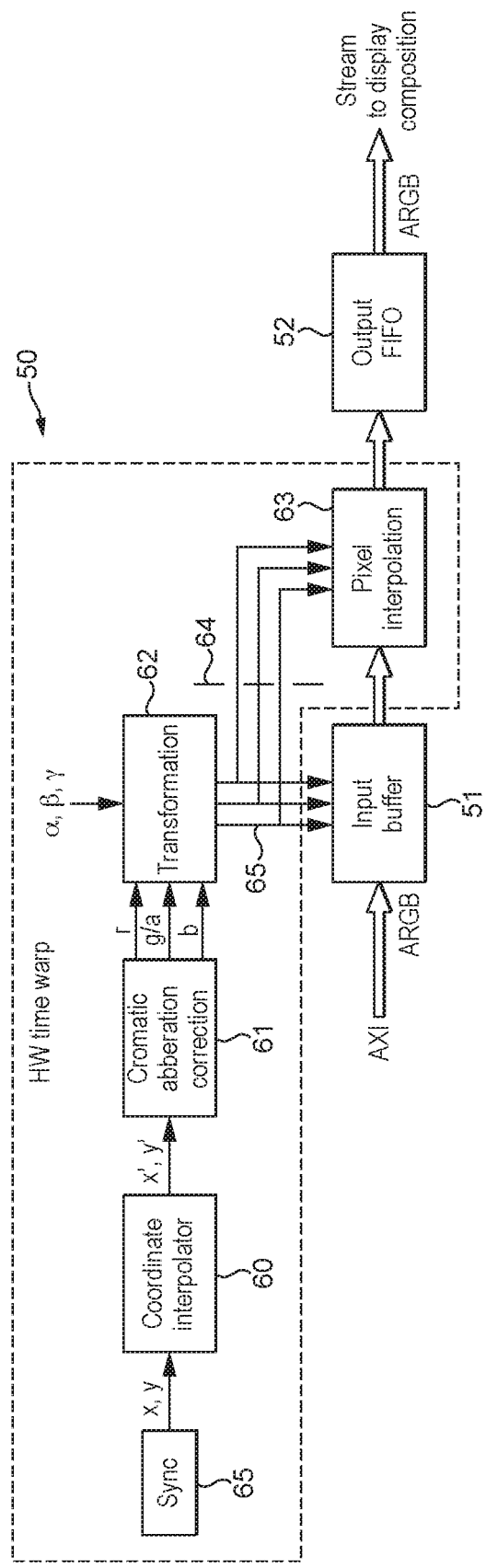
FIG. 3 shows the transformation engine of the display processor of FIG. 4 in more detail.

FIG. 3 shows the transformation engine 50 of the display processor shown in FIG. 2 in more detail.

As shown in FIG. 3, the transformation engine 50 of the display processor comprises a number of stages, namely a coordinate interpolator stage 60, a chromatic aberration correction stage 61, a view orientation transformation stage 62, and an interpolation stage 63. Each of these stages is in the present embodiments implemented in the form of a fixed-function hardware module (processing circuits/circuitry) that is configured to perform a particular processing operation on the input data that it receives, but also has some limited configurability by virtue of the ability to vary certain control parameters for each module. The control parameters are in the present embodiment set by the driver 11 for the display processor 5 when a sequence of frames is to be displayed, based on the particular headset (display) 4 that the system is being used with.

Other arrangements would, of course, be possible.

The coordinate interpolator stage 60 operates to determine for a sampling position x, y in the output transformed surface that is to be output from the transformation engine, a corresponding position (coordinate) x', y' in the input frame (in the frame rendered by the GPU 2 that is stored in the memory 3 that is to be displayed to the user) based on a defined lens distortion that corresponds to the lens distortion that will be introduced to the output transformed frame when displayed on the display panel of the display 4 and viewed through the lenses of the head-mounted display.

The coordinate interpolator stage 60 may, for example, execute some form of cubic curve or ellipsoid function for this purpose with, e.g., parameters of that function, such as the focal points of the ellipsoid, being settable by means of control parameters by the driver for the display processor.

The chromatic aberration correction stage 61, takes the input surface position (coordinates) x', y' determined by the coordinate interpolator stage 60 and "corrects" those coordinates to take account of chromatic aberrations that will be introduced by the lenses of the head-mounted display 4.

As shown in FIG. 3, a separate chromatic aberration correction is performed for each colour plane (R, G, B). The green colour plane chromatic aberration is also used for the alpha (transparency) plane.

The output of this chromatic aberration correction stage 61 is accordingly three sets of modified input frame positions (coordinates), one set $x_R'$, $y_R'$ for use for sampling the red colour plane in the input frame, one set $x_G'$, $y_G'$ for sampling the green and alpha (transparency) planes in the input frame, and one set $x_B'$, $y_B'$ for sampling the blue plane in the input frame.

The modified input frame positions determined by the chromatic aberration correction stage 61 are then provided to the view orientation transformation stage 62.

This stage takes as its input a set of transformation parameters that correspond to a predicted view orientation that the input frame is to be rendered as if viewed from for display on the display 4, and operates to generate a projection of the input frame based on (that corresponds to) the predicted view orientation. (This will be discussed in more detail below.)

The view orientation transformation stage 62 accordingly performs a further transformation on each input frame position provided by the chromatic aberration correction stage to thereby provide a set of view orientation transformed input frame positions ($x_R''$, $y_R''$), ($x_G''$, $y_G''$), ($x_B''$, $y_B''$) which will then be used to sample the input frame to derive the colour values to be used for the output transformed frame sampling (data element) position x, y, that is currently being generated.

The transformation that the view orientation transformation stage 62 performs on each input frame position may comprise, for example, a 3D rotation of the 2D plane (image) (a perspective transform/a 2D homography). Again, this can be adjusted in use by the driver setting control parameters for the transformation stage 62 appropriately.

The transformed input frame positions determined by the view orientation transformation stage 62 are provided to an interpolation stage 63, which samples the input frame at the indicated positions to determine the input frame values at those respective input frame positions. This is done by appropriate interpolation of the input frame values for defined input frame sampling (data element) positions.

The interpolation of the input frame sampling position data can be performed in any suitable and desired way. In the present embodiments, bilinear interpolation is used, but other arrangements could be used, if desired.

As different input frame positions (coordinates) are determined for the different colour planes, in the present embodiments a separate set of data is accordingly interpolated for the output transformed frame sampling position (data element) for each colour plane (based on the determined input frame position for that colour plane). Thus, the set of RGB colour data for an output transformed frame sampling position (data element) will comprise a red value determined from the determined "red" input frame position (coordinate) ($x_R''$, $y_R''$), a green value determined from the determined "green" input frame position (coordinate) ($x_G''$, $y_G''$), and a blue value determined from the determined "blue" input frame position (coordinate) ($x_B''$, $y_B''$).

Where an alpha (transparency) value is also to be determined, then, as discussed above, that is determined from the input frame position (coordinate) that is used to determine the green colour value.

The interpolated values are then output to the output buffer (FIFO) 52 as shown in FIG. 3, for provision to the remainder of the display processor's display processing pipeline for provision to the display 4 for display to the user.

As shown in FIG. 3, in order that the appropriate input frame data is available for the interpolation stage 63, the modified input surface positions that are determined by the view orientation transformation stage 62 (and that are to be sampled by the interpolation stage 63) are used 65 to control the fetching of the appropriate regions of the input frame containing those sampling positions into the input buffer 51 prior to them being used by the interpolation stage 63.

To do this, the integer parts of the input frame positions determined by the view orientation transformation stage 62 are used to identify the appropriate two-dimensional blocks of the input frame that contain the required input frame data. The input stage then operates to load those respective input frame blocks into the input buffer 51.

As also shown in FIG. 3, to allow for latency between requesting input frame data into the input buffer 51 for use by the interpolation stage 63 and the interpolation stage 63 processing that data to provide an output transformed frame sampling position, there may be an appropriate delay (latency-absorbing) mechanism 64 included in the transformation stage. This can be implemented as desired.

As shown in FIG. 3, the operation of the transformation engine 50 is triggered, and its timing controlled, by receipt of appropriate synchronisation signals 65 from the display 4.

Figure 4:
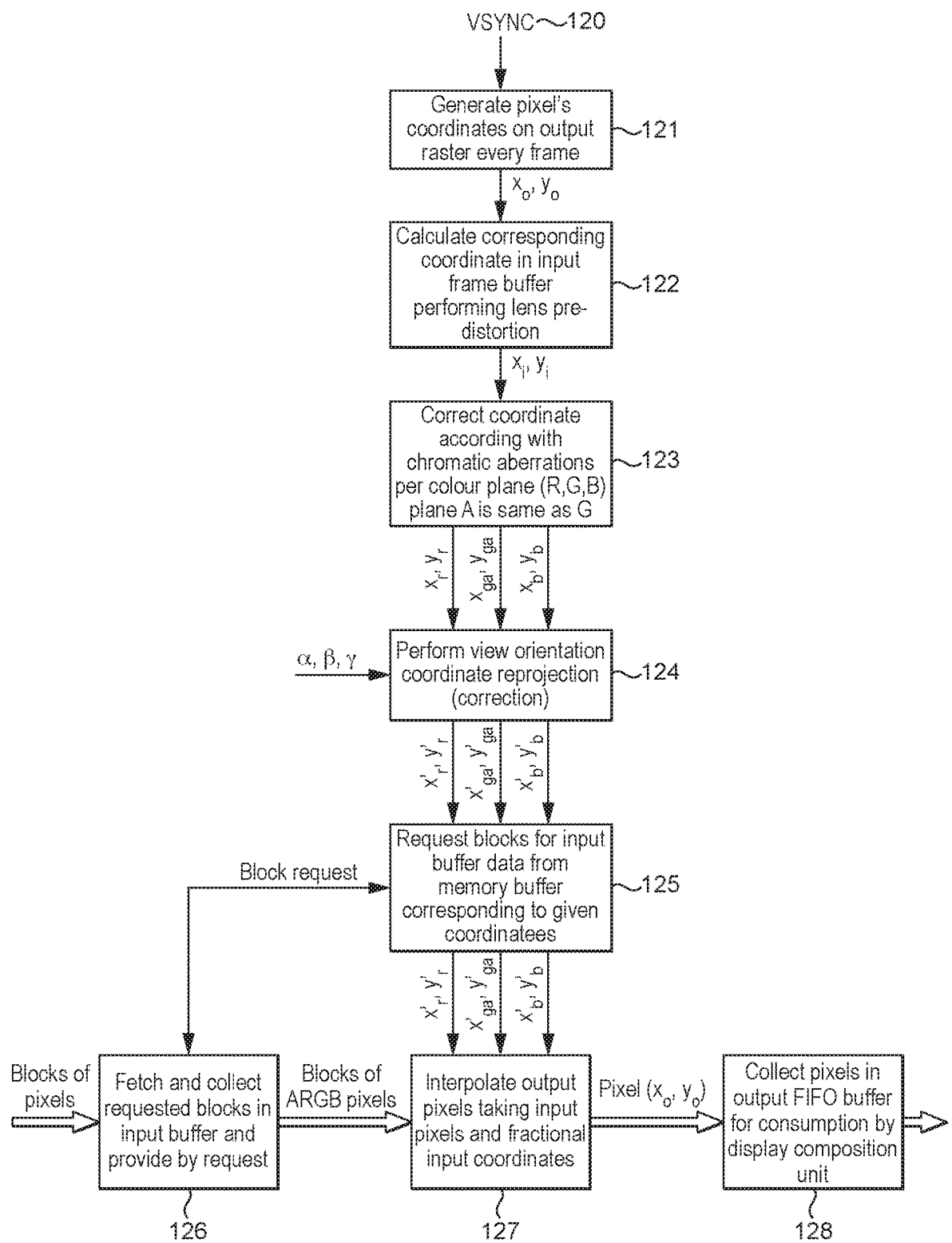
FIG. 4 is a flowchart showing the operation of the transformation engine of the display processor of FIG. 2 in more detail.

FIG. 4 is a flowchart showing the operation of the transformation engine 50 as shown in FIG. 3.

FIG. 4 shows the operation for a respective pixel (data) position in the output transformed frame that is to be generated for display. This operation is repeated for each output transformed frame pixel (data position) that is required.

As shown in FIG. 4, the process starts with an appropriate synchronisation signal 120 indicating the start of a new output frame for display.

The desired output transformed frame pixel coordinates to be generated next, $x_o$, $y_o$, are then determined (step 121).

The coordinate interpolator stage 60 then operates to determine for the pixel (sampling) position $x_o$, $y_o$, in the output transformed frame that is to be output from the transformation engine, a corresponding position (coordinate) $x_i$, $y_i$ in the input frame (in the frame rendered by the GPU 2 that is stored in the memory 3 that is to be displayed to the user) based on a defined lens distortion that corresponds to the lens distortion that will be introduced to the output transformed frame when displayed on the display panel of the display 4 and viewed through the lenses of the head-mounted display (step 122).

The chromatic aberration correction stage 61 then takes the input frame position (coordinates) $x_i$, $y_i$ determined by the coordinate interpolator stage 60 at step 122 and "corrects" those coordinates to take account of chromatic aberrations that will be introduced by the lenses of the display 4 (step 123), to provide the three sets of modified input frame positions (coordinates) $x_r$, $y_r$; $x_{ga}$, $y_{ga}$; $x_b$, $y_b$.

The modified input frame positions determined by the chromatic aberration correction stage 61 at step 123 are then subjected to the "view orientation" coordinate reprojection (correction) by the transformation stage 62 based on the current input set of parameters corresponding to the desired predicted view orientation (step 124) to thereby provide a set of predicted view orientation transformed input frame positions $(x'_r, y'_r)$, $(x'_{ga}, y'_{ga})$, $(x'_b, y'_b)$.

The so-determined input frame positions are then used, as shown in FIG. 4, to request the fetching of appropriate blocks of the input frame that include the necessary input frame sampling position data into the input buffer to allow the data values for the determined input frame positions to be determined by the interpolation stage 63. This uses the integer part of each determined input frame position to identify which input frame blocks will be required. The identified input frame blocks are then fetched and stored in the input buffer (step 126).

The interpolation stage then reads the appropriate input frame data positions from the input frame blocks stored in the input buffer and interpolates the appropriate data values for the output frame pixel (sampling position) $(x_o, y_o)$ in question (step 127).

The so-generated output pixels are then collected in the output buffer for subsequent provision to (and consumption by) the display composition unit and provision to the display for display (step 128).

As shown in FIGS. 3 and 4, the transformation engine of the display processor 5 generates the output transformed frame to be displayed to the user as a sequence of sampling positions (pixels) in that output transformed frame (on a sampling position-by-sampling position) (pixel-by-pixel) basis. In the present embodiments, the transformation engine is configured to generate the output transformed frame raster line-by-raster line (e.g. as that is the order in which that output transformed frame will be needed to be provided to the display 4 for display).

The present embodiments relate in particular to the operation of the data processing system when displaying frames on the display 4 which are to be transformed with respect to a predicted view orientation, which may, e.g. be the case where the display is being used to display frames to a user for an augmented reality or virtual reality application, for example.

In the present embodiments, when displaying frames on the field sequential display 4 that are to be transformed with respect to a predicted view orientation, the separate colour fields for a frame are each transformed (re-projected) based on their own, individual, and respective, predicted view orientation, corresponding to the time at which the respective colour field will be displayed. This is done by the transformation engine in the display processor 5 transforming (re-projecting) each colour field for the frame based on a predicted view orientation for that particular colour field.

The predicted view orientation for a colour field (and the parameters to cause the transformation engine to transform the colour field based on that predicted view orientation) is determined in the present embodiments by means of a predicted view orientation determining engine 15 that executes on the CPU 7. This predicted view orientation determining engine uses the latest sensed view orientation (rotation and position) for the display, the time at which the frame being displayed was generated for, the target display time for the colour field in question (i.e. the time when the colour field will be displayed), and an estimate of the user's current head motion (e.g. based on tracking of the user's previous head motion), to determine a predicted view orientation for a (and each) colour field.

In the present embodiments, the predicted view orientation could be determined, e.g., at the beginning of each frame and/or colour field (where the colour fields are handled separately in the display processor), or, e.g., more frequently, such as at intervals within the frame/field in question, if desired.

Figure 8:
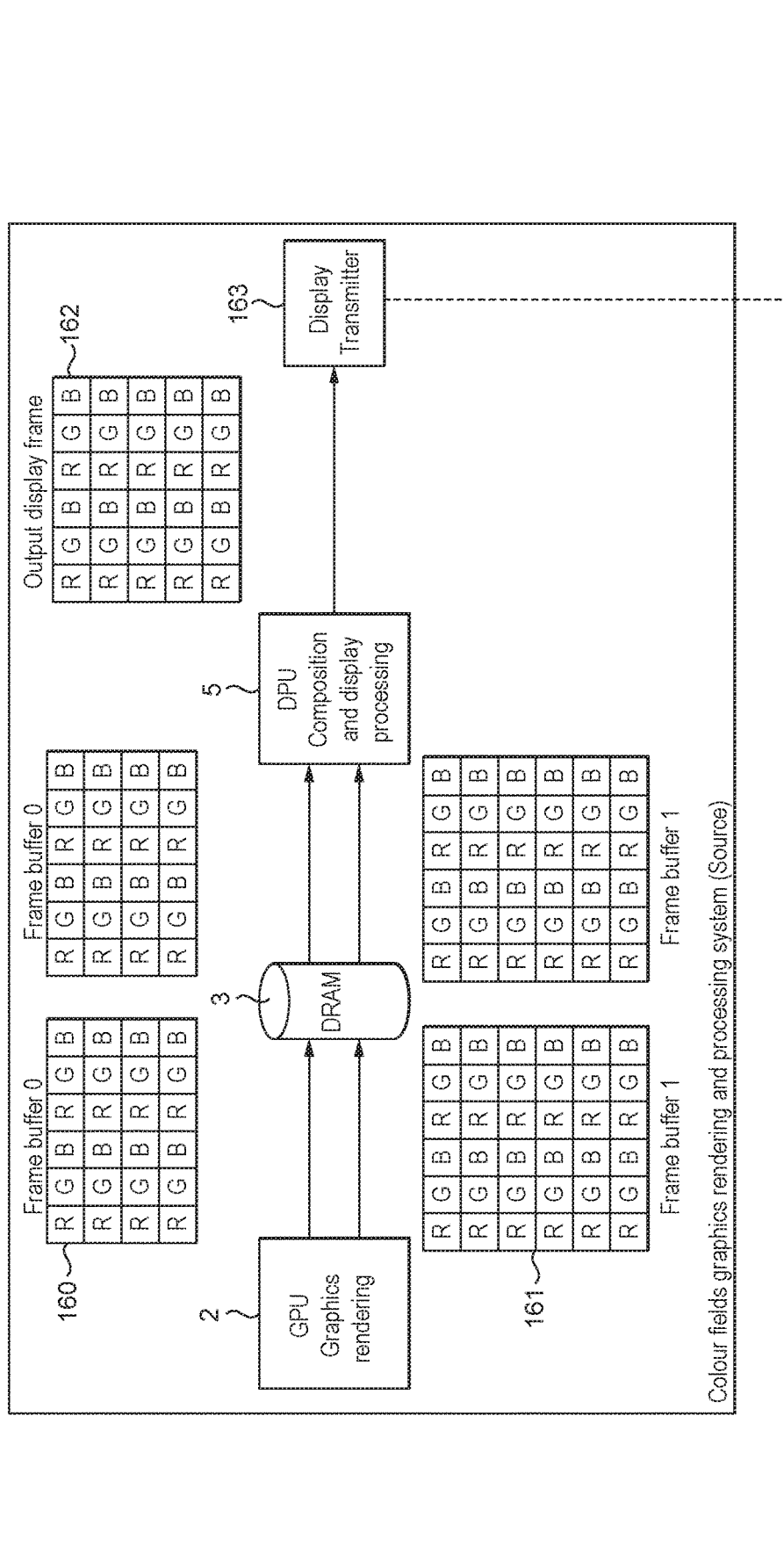
FIGS. 8 and 9 show a first embodiment of the technology described herein.
Figure 9:
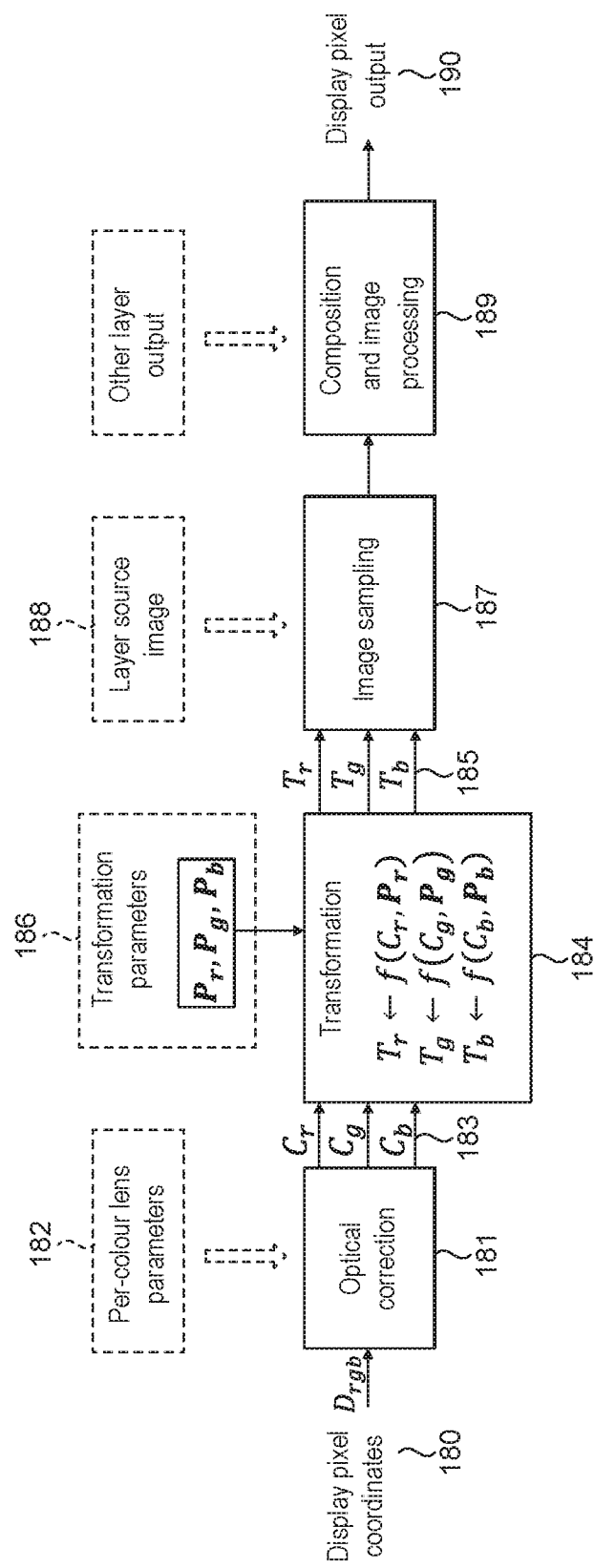

FIGS. 8 and 9 show a first embodiment in which the respective colour fields for a frame are subjected to their own transformation (re-projections) based on their own predicted view orientations.

In this embodiment, the display processor processes the colour fields together, and the respective colour fields are then separated for provision to the display panel of the display 4 in the display itself.

FIG. 8 illustrates this, and shows the graphics processor 2 producing respective frames 160, 161 that it then stores in the memory 3 for processing by the display processor 5. In this example, it is assumed that the display processor 5 will composite the two frames 160, 161 to provide a composited frame 162 for display, which is then transmitted, e.g. via a display transmitter 163 to the display 4 (to a receiver 164 of the display 4). (As shown in FIG. 8, the display 4 may have a wired or wireless link to the display processor 5 (and the display transmitter 163).)

In this embodiment, because, as shown in FIG. 8, the output frame 162 to be displayed is provided as combined (interleaved) RGB data, that frame data is first stored in an on-chip frame buffer 165 of the display 4, so that it can be separated into the respective colour fields 166 by the display driver circuit 167 for provision as a sequence of respective separate colour fields to the display panel 168 for display.

As discussed above, in this embodiment, as part of its processing, the display processor re-projects each colour plane based on a predicted view orientation separately (i.e. using a respective, predicted view orientation for the particular colour plane in question).

This is done by the transformation engine 50 of the display processor 5.

FIG. 9 illustrates this process, and corresponds generally to the transformation engine arrangement shown in FIG. 3.

Thus FIG. 9 shows applying appropriate optical correction 181 (which corresponds to the lens distortion correction and chromatic aberration correction shown in FIG. 3) to respective display pixel coordinates, based on appropriate per-colour lens parameters 182 (which will be set based on the lens system that the display is being viewed through), to provide a set of optically corrected pixel coordinates for each respective colour field, $C_r$, $C_g$, $C_b$ 183.

The respective optically corrected pixel coordinates 183 are then separately subjected, as shown in FIG. 9, to respective per colour plane transformations $P_r$, $P_g$, $P_b$ 184 to give respective, individual colour plane, appropriately transformed sampling coordinates $T_r$, $T_g$, $T_b$ 185 for each separate colour field.

As shown in FIG. 9, these per-colour plane (field) transformations use a separate predicted view orientation transformation $P_r$, $P_g$, $P_b$, 186 for each colour field, that have been predicted based on the respective time at which the colour field in question will be displayed on the display panel 168.

The so-transformed (re-projected) pixel coordinates are then used to sample 187 the input image (frame) 188 that is to be displayed, with the sampled pixels then being provided to the appropriate further processing stages of the display processor processing, such as composition and other image processing 189.

The so-transformed and re-projected pixels are then provided to the display pixel output 190 appropriately.

Figure 10:
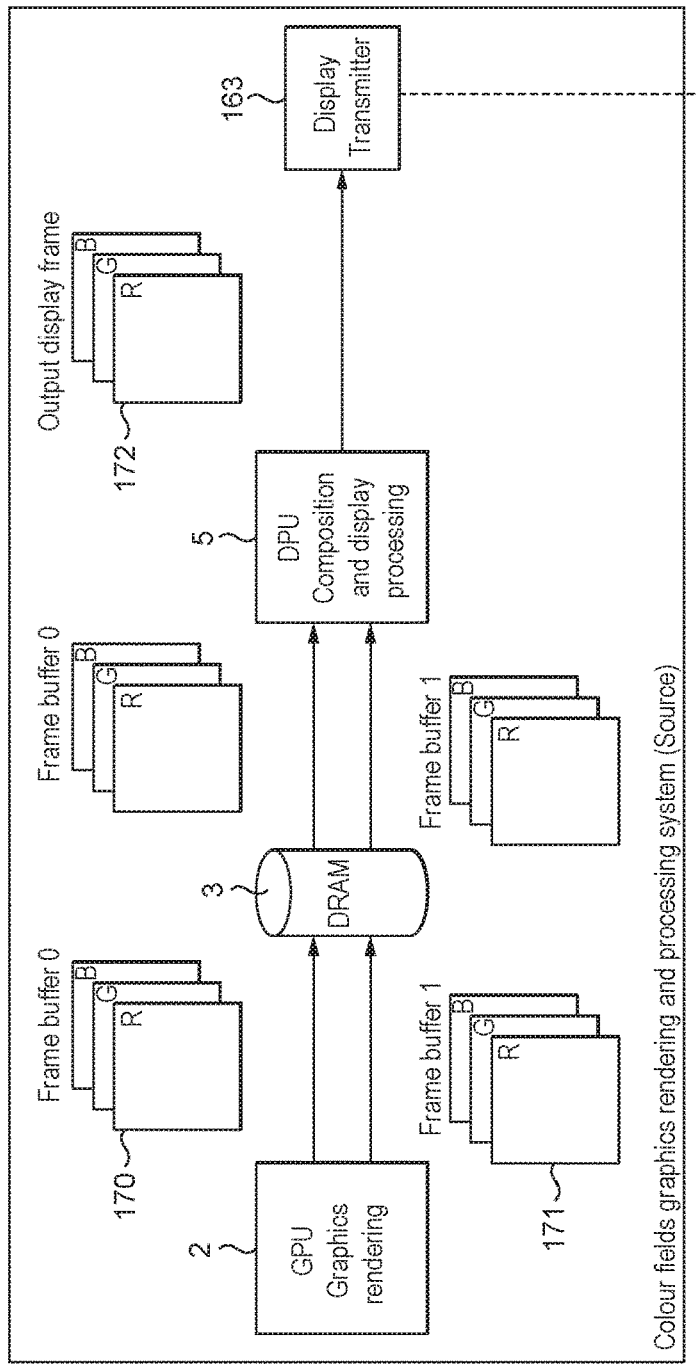
FIGS. 10 and 11 show a second embodiment of the technology described herein.
Figure 10:
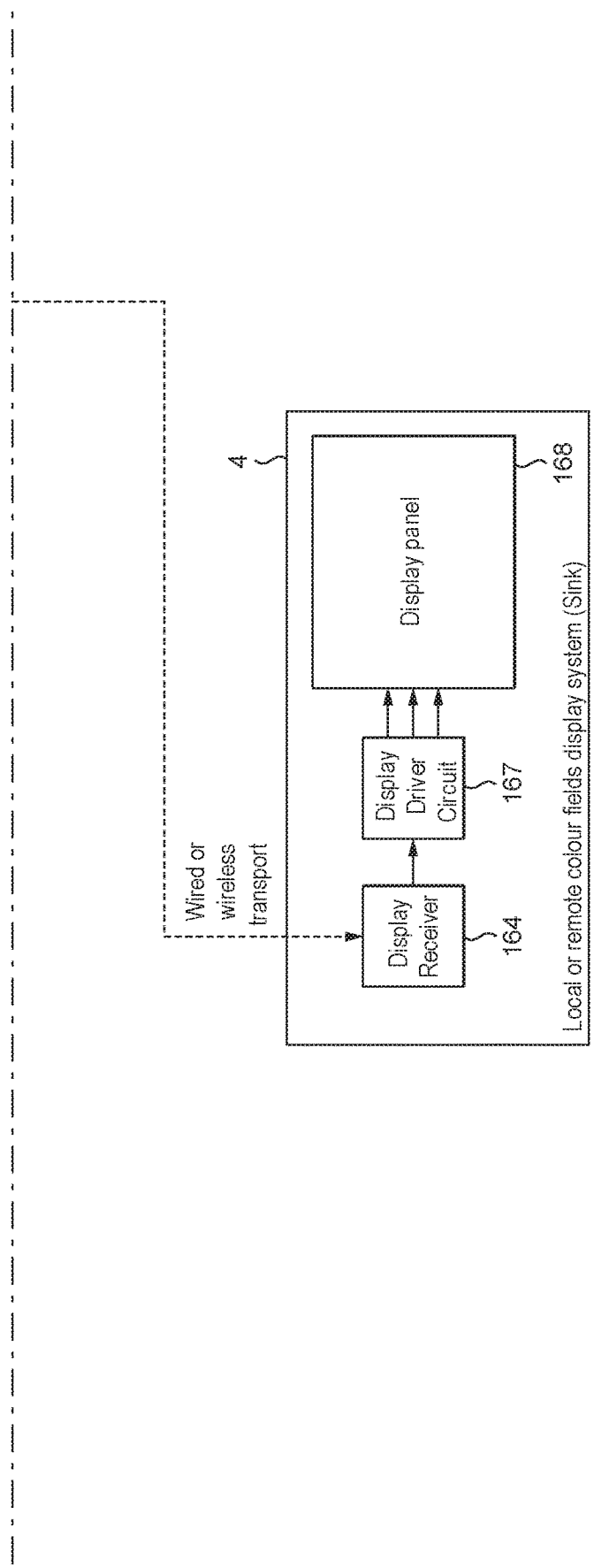
Figure 11:
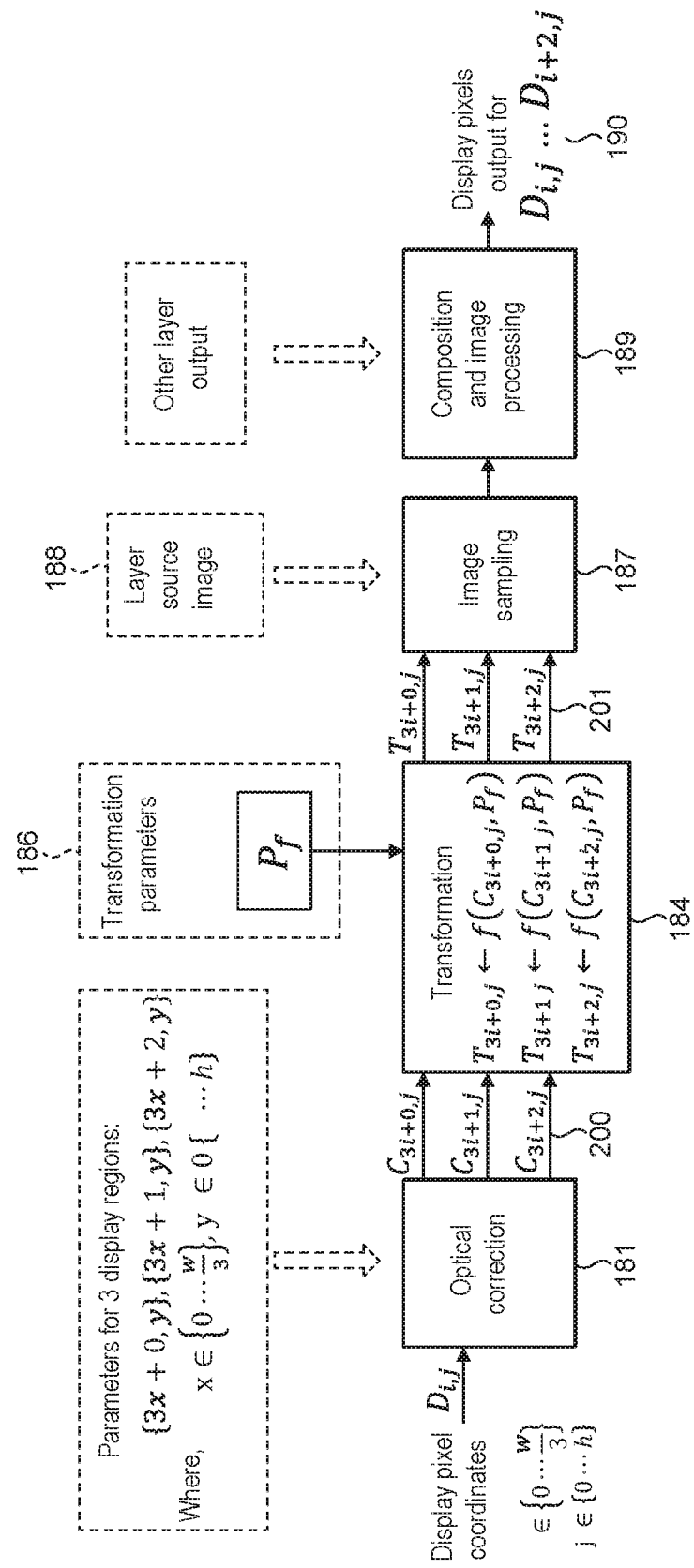

FIGS. 10 and 11 show a second embodiment.

In this embodiment, as shown in FIG. 10, the frames 170, 171 to be displayed are provided to the display processor 5 by the graphics processor 2 already separated into their respective colour fields (i.e. as three single colour plane images). This is achieved in this embodiment by the graphics processor 2 storing the frames it produces in the memory 3 in the form of separate colour planes.

The display processor 5 then processes the three colour planes separately, and so provides as its output for the display 4, three separate colour planes 172 for the frame to be displayed. In this case, as shown in FIG. 10, as the frames provided to the display 4 are provided in the form of separate colour planes 172, there is no need to perform any colour plane separation on the display 4 itself, but rather the received data can simply be scanned directly by the display driver circuit 167 on to the display panel 168 as it is received. This then avoids, for example, the need to include an on-chip frame buffer 165 on the display 4.

FIG. 11 shows the corresponding colour field re-projection (transformation) performed in the display processor in this embodiment.

In this case, the display processor is configured to transform three pixels from a given colour plane in parallel (rather than, as shown in FIG. 9, processing three different colour values from a single pixel in parallel).

Thus, in this case, as shown in FIG. 11, for a given display pixel coordinate $D_{i,j}$, the optical correction stage 181 of the display processing pipeline acts to provide as an output 200 three respective optically corrected pixel positions within the single colour plane that is currently being processed.

This is achieved by producing one optically corrected pixel position corresponding to the output display pixel coordinate, an optically corrected pixel position within the input colour plane corresponding to the next display pixel coordinate along a particular axis direction (in this case along the row of display pixel coordinates), and an optically corrected pixel position within the input colour plane for the next but one display pixel coordinate along the axis direction (in this case row) in question.

As also shown in FIG. 11, the display pixel coordinates that are used for the transformation operation are also correspondingly configured to trigger the selection and generation of input colour plane pixel coordinates corresponding to groups of three successive display pixel coordinates.

The optically corrected pixel positions 200 are then subjected 184 to the appropriate predicted view orientation transformation $P_f$ 186 for the colour field in question, to provide three predicted view orientation re-projected pixel positions 201 to sample from the colour field in question.

The image sampling process 187 then samples the appropriate pixel positions within the input colour plane 188 in question, and provides those pixel values to the subsequent composition and image processing stages 189 where they are processed appropriately and then provided for display 190.

It can be seen from the above that the technology described herein, in its embodiments at least, provides an arrangement that can provide more efficient operation when using head-mounted field sequential colour displays. This is achieved, in the embodiments of the technology described herein at least, by transforming the individual colour fields to be displayed on the display based on their own, separate, predicted view orientations, and/or by providing frames to be displayed to the display already separated into their respective colour fields.

The foregoing detailed description has been presented for the purposes of illustration and description. It is not intended to be exhaustive or to limit the technology to the precise form disclosed. Many modifications and variations are possible in light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a data processing system, the data processing system comprising:
a field sequential colour display operable to display frames for display;
a producer processor operable to generate frames for display on the display;
a display processor operable to provide frames generated by the producer processor to the display for display; and
a transformation engine operable to transform a frame generated by the producer processor based on a view orientation to provide a view orientation transformed frame for display on the display;
the method comprising:
when displaying a frame generated by the producer processor that is to be transformed based on a predicted view orientation on the field sequential colour display:
the transformation engine transforming each colour field to be displayed on the display for the frame based on a predicted view orientation for that particular colour field, such that each colour field will be subjected to a different view orientation transformation to the other colour fields for the frame; and
displaying the so-transformed colour fields sequentially on the display to display the frame;
wherein the display processor comprises three colour processing pipelines, wherein each colour processing pipeline is configured to process one colour channel of three colour channels of a data element of the frame to be displayed, and wherein the three colour processing pipelines are configured to process three colour channels of a data element in parallel; and
the method further comprises:
the transformation engine, when transforming a single colour field for the frame to be displayed based on a predicted view orientation:
determining based on a data element position in the view orientation transformed frame that is to be output, a corresponding position in the colour field to that data element position in the view orientation transformed frame, and two further positions in the colour field that correspond to two other data element positions in the view orientation transformed frame; and
modifying the said positions in the colour field based on the predicted view orientation to provide three output positions in the colour field to be sampled, to provide data to use for three different data elements from the single colour field; and
the display processor, when providing the single colour field to the display for display, using the three colour processing pipelines to process the three different data elements from the single colour field in parallel.

2. The method of claim 1, wherein the producer processor is a graphics processor.

3. The method of claim 1, wherein the predicted view orientation for a color field is based on a sensed view orientation for the display and a time when the color field will be displayed on the display.

4. The method of claim 1, comprising displaying only three color fields for each frame that is displayed.

5. The method of claim 1, wherein the transformation engine is provided in the display processor, and the predicted view orientation-based transformation is performed as part of the processing that is performed by the display processor when processing the frame for providing to the display.

6. The method of claim 1, comprising the transformation engine transforming each color field to be displayed on the display for a frame based on both a predicted view orientation for that particular color field, and one or more of: a chromatic aberration correction and a lens distortion correction.

7. The method of claim 1, comprising the display processor providing the data for the frame to the display for display already separated into respective separate color fields.

8. The method of claim 7, comprising:
the producer processor providing the frame for processing by the display processor in the form of separate color fields; and
the display processor processing each color field provided by the producer processor separately, and providing the separate color fields as separate color fields to the display for display.

9. A data processing system comprising:
a field sequential colour display operable to display frames for display;
a producer processor operable to generate frames for display on the display;
a display processor operable to provide frames generated by the producer processor to the display for display; and
a transformation engine operable to transform a frame generated by the producer processor based on a view orientation to provide a view orientation transformed frame for display on the display;
wherein the transformation engine is configured to:
for a frame generated by the producer processor to be displayed on the field sequential colour display that is to be transformed based on a predicted view orientation:
transform each colour field to be displayed on the display for the frame based on a predicted view orientation for that particular colour field, such that each colour field will be subjected to a different view orientation transformation to the other colour fields for the frame; and
the data processing system is further configured to:
display the so-transformed colour fields sequentially on the display to display the frame;
wherein the display processor comprises three colour processing pipelines, wherein each colour processing pipeline is configured to process one colour channel of three colour channels of a data element of a frame to be displayed, and wherein the three colour processing pipelines are configured to process three colour channels of a data element in parallel; and
wherein the transformation engine is configured to, when transforming a single colour field for a frame to be displayed based on a predicted view orientation:
determine based on a data element position in the view orientation transformed frame that is to be output, a corresponding position in the colour field to that data element position in the view orientation transformed frame, and two further positions in the colour field that correspond to two other data element positions in the view orientation transformed frame; and
modify the said positions in the colour field based on a predicted view orientation to provide three output positions in the colour field to be sampled to provide data to use for three different data elements from the single colour field; and the display processor is further configured to, when providing the single colour field to the display for display, use the three colour processing pipelines to process the three different data elements from the single colour field in parallel.

10. The system of claim 9, wherein the producer processor is a graphics processor.

11. The system of claim 9, wherein the predicted view orientation for a color field is based on a sensed view orientation for the display and a time when the color field will be displayed on the display.

12. The system of claim 9, wherein the data processing system is configured to display only three color fields for each frame that is displayed.

13. The system of claim 9, wherein the transformation engine is provided in the display processor, and the predicted view orientation-based transformation is performed as part of the processing that is performed by the display processor when processing the frame for providing to the display.

14. The system of claim 9, wherein the transformation engine is configured to transform each color field to be displayed on the display for a frame based on both a predicted view orientation for that particular color field, and one or more of: a chromatic aberration correction and a lens distortion correction.

15. The system of claim 9, wherein the display processor is configured to provide the data for a frame to the display for display already separated into respective separate color fields.

16. The system of claim 15, wherein:
the producer processor is configured to provide a frame for processing by the display processor in the form of separate color fields; and
the display processor is configured to process each color field provided by the producer processor separately, and provide the separate color fields as separate color fields to the display for display.

17. A non-transitory computer-readable storage medium comprising computer software code which when executing on a data processor performs a method of operating a data processing system, the data processing system comprising:
a field sequential colour display operable to display frames for display;
a producer processor operable to generate frames for display on the display;
a display processor operable to provide frames generated by the producer processor to the display for display; and
a transformation engine operable to transform a frame generated by the producer processor based on a view orientation to provide a view orientation transformed frame for display on the display;

the method comprising:

when displaying a frame generated by the producer processor that is to be transformed based on a predicted view orientation on the field sequential colour display:

the transformation engine transforming each colour field to be displayed on the display for the frame based on a predicted view orientation for that particular colour field, such that each colour field will be subjected to a different view orientation transformation to the other colour fields for the frame; and displaying the so-transformed colour fields sequentially on the display to display the frame;

wherein the display processor comprises three colour processing pipelines, wherein each colour processing pipeline is configured to process one colour channel of three colour channels of a data element of a frame to be displayed, and wherein the three colour processing pipelines are configured to process three colour channels of a data element in parallel; and the method further comprises:

the transformation engine, when transforming a single colour field for a frame to be displayed based on a predicted view orientation:

determining based on a data element position in the view orientation transformed frame that is to be output, a corresponding position in the colour field to that data element position in the view orientation transformed frame, and two further positions in the colour field that correspond to two other data element positions in the view orientation transformed frame; and modifying the said positions in colour field based on the predicted view orientation to provide three output positions in the colour field to be sampled, to provide data to use for three different data elements from the single colour field; and the display processor, when providing the single colour field to the display for display, using the three colour processing pipelines to process the three different data elements from the single colour field in parallel.

* * * * *